(12) United States Patent
Hori

(10) Patent No.: US 10,359,604 B2
(45) Date of Patent: Jul. 23, 2019

(54) ZOOM LENS AND IMAGE PICKUP APPARATUS INCLUDING THE SAME

(71) Applicant: CANON KABUSHIKI KAISHA, Tokyo (JP)

(72) Inventor: Masao Hori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/296,686

(22) Filed: Oct. 18, 2016

(65) Prior Publication Data
US 2017/0108676 A1   Apr. 20, 2017

(30) Foreign Application Priority Data
Oct. 20, 2015   (JP) .................. 2015-206069

(51) Int. Cl.
| | |
|---|---|
| *G02B 9/60* | (2006.01) |
| *G02B 9/64* | (2006.01) |
| *G02B 9/62* | (2006.01) |
| *G02B 15/173* | (2006.01) |
| *G02B 27/64* | (2006.01) |

(52) U.S. Cl.
CPC .............. *G02B 9/60* (2013.01); *G02B 9/62* (2013.01); *G02B 9/64* (2013.01); *G02B 15/173* (2013.01); *G02B 27/646* (2013.01)

(58) Field of Classification Search
CPC .................................................. G02B 13/009
USPC ....... 359/656, 657, 676, 681–685, 695, 713, 359/714, 745, 746
See application file for complete search history.

(56) References Cited

U.S. PATENT DOCUMENTS

| | | | | |
|---|---|---|---|---|
| 2009/0168179 A1* | 7/2009 | Toyoda | ................ | G02B 15/173 359/557 |
| 2013/0301141 A1 | 11/2013 | Ryu | | |

FOREIGN PATENT DOCUMENTS

| | | |
|---|---|---|
| JP | 2001-100099 A | 4/2001 |
| JP | 2008216440 A | 9/2008 |
| JP | 2012-098592 A | 5/2012 |

(Continued)

OTHER PUBLICATIONS

Matsui, "The 23rd meeting of the Japan Society of Applied Physics" (1962), pp. 124-126.

(Continued)

*Primary Examiner* — Darryl J Collins
*Assistant Examiner* — Journey F Sumlar
(74) *Attorney, Agent, or Firm* — Carter, DeLuca & Farrell LLP

(57) ABSTRACT

Provided is a zoom lens, including first to fourth lens units having positive, negative, positive, and positive refractive powers and a rear lens unit, which are arranged in order from object side to image side, in which: rear lens unit includes a negative front-side subunit and a positive rear-side subunit arranged in order from object side to image side; front-side subunit moves in a direction having a component perpendicular to optical axis; and front-side subunit includes at least one positive lens and at least one negative lens. A focal length of front-side subunit, a focal length of one positive lens of the at least one positive lens, a refractive index and an Abbe number of a material of the one positive lens, and a refractive index and an Abbe number of a material of one negative lens of the at least one negative lens are set appropriately.

20 Claims, 14 Drawing Sheets

(56) References Cited

FOREIGN PATENT DOCUMENTS

| JP | 2013-003240 A | 1/2013 |
| JP | 2014048312 A | 3/2014 |
| JP | 2014102462 A | 6/2014 |

OTHER PUBLICATIONS

Japanese office action issued in corresponding application No. 2015-206069 dated Sep. 18, 2018, with English translation, 8 pages.

* cited by examiner

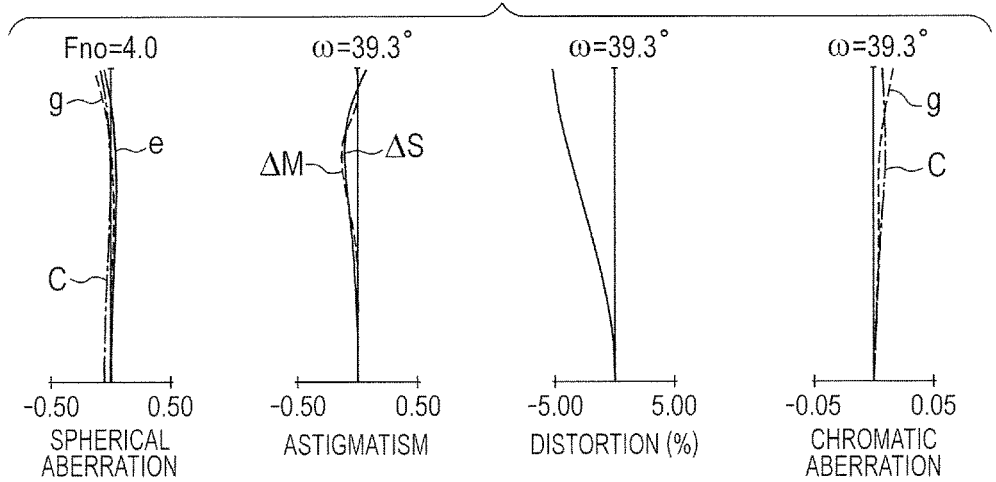
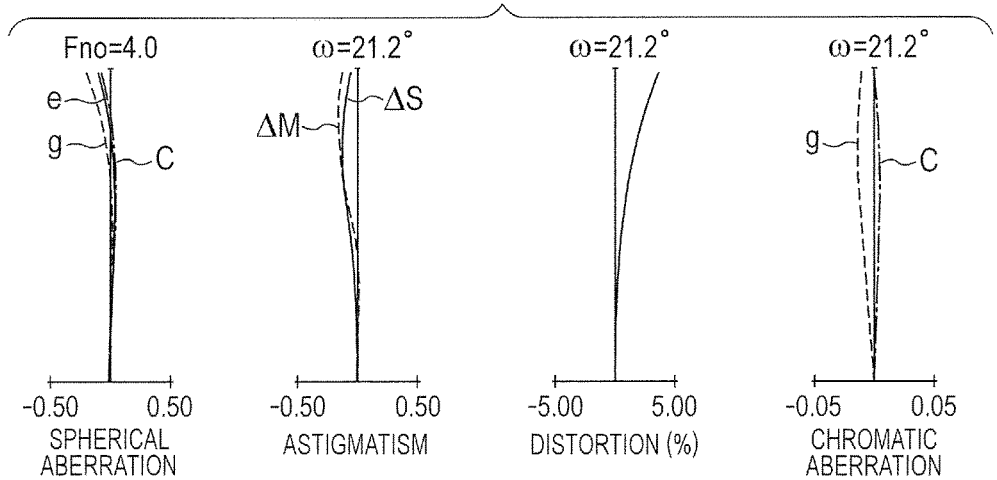
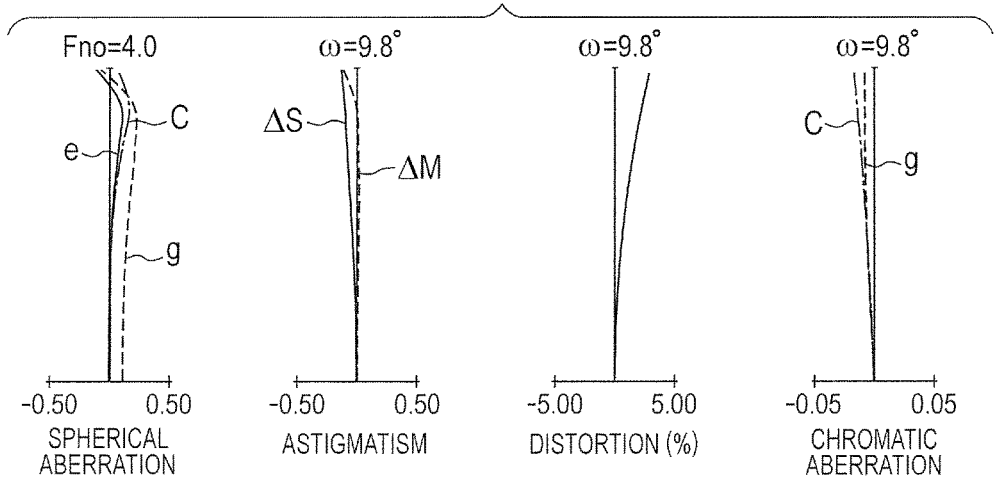

LV: U2, U3, U4

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are suitable for an image pickup apparatus using an image pickup element, e.g., a video camera, an electronic still camera, a broadcasting camera, or a monitoring camera, or an image pickup apparatus, e.g., a silver-halide film camera.

Description of the Related Art

In recent years, as an image pickup optical system to be used in an image pickup apparatus using an image pickup element, a zoom lens is required to have an entire system being compact (small in size) and have a high zoom ratio (high magnification varying ratio) as well as a high resolution. In particular, recently, the image pickup element to be used has a substantially uniform resolution over an entire image pickup range, and hence the zoom lens using such an image pickup element is required to have high optical performance with a substantially uniform resolution over a range from an image plane center to an image plane periphery.

Further, the zoom lens is required to have a mechanism (image stabilizing mechanism) for compensating blurring of an image (image blur) that occurs when an accidental vibration, e.g., a camera shake, is transmitted to the zoom lens. As a zoom lens that satisfies those requirements, a positive-lead type zoom lens in which a lens unit having a positive refractive power is arranged on an object side has been known. There is known a zoom lens having an image stabilizing function for compensating the blurring of an image (image blur) that occurs when a vibration is accidentally transmitted to the positive-lead type zoom lens by moving a partial lens unit (vibration isolation unit) so as to have a component in a direction perpendicular to an optical axis.

In Japanese Patent Application Laid-Open No. 2012-98592, there is described a zoom lens having a five-unit configuration including, in order from an object side to an image side, a first lens unit to a fifth lens unit having positive, negative, positive, negative, and positive refractive powers. In the zoom lens, the fourth lens unit is formed of one component, and is configured to correct an image blur.

In Japanese Patent Application Laid-Open No. 2013-3240, there is described a zoom lens having a five-unit configuration including, in order from the object side to the image side, a first lens unit to a fifth lens unit having positive, negative, positive, positive, and positive or negative refractive powers. In the zoom lens, the fifth lens unit is formed of a lens unit Ln having a negative refractive power and a lens unit Lp having a positive refractive power. The lens unit Ln having a negative refractive power is configured to correct an image blur.

A method of conducting image stabilization by decentering a subunit, which is a part forming the zoom lens, in a direction perpendicular to the optical axis involves a decentering aberration that occurs when the subunit is decentered. Hitherto, in regard to the decentering aberration that occurs when a subsystem within an optical system is decentered in the direction perpendicular to the optical axis, a method for aberration correction is known from a standpoint of an aberration theory (Matsui, "The 23rd meeting of the Japan Society of Applied Physics (1962)").

In recent years, the zoom lens to be used in the image pickup apparatus is strongly desired to have an entire lens system being small in size with a high zoom ratio and have an image stabilizing function. The method of conducting the image stabilization by decentering a vibration isolation unit for image blur correction in the direction perpendicular to the optical axis is advantageous in that a special optical system is not required for the image stabilization.

When correction is conducted by moving the vibration isolation unit for image blur correction in the direction perpendicular to the optical axis, the vibration isolation unit is required to be small in size and lightweight in order to make a moving mechanism (image stabilizing mechanism) smaller in size and achieve lower power consumption. Further, aberration variations, in particular, variations in a chromatic aberration are required to be small during image blur correction, and satisfactory optical performance is required to be maintained even during the image stabilization.

The zoom lens including the partial lens unit, which serves as the vibration isolation unit and is parallelly decentered in the direction perpendicular to the optical axis to correct an image blur, can correct an image blur relatively easily. However, unless a lens configuration of the zoom lens and a lens configuration of the vibration isolation unit to be moved for the image stabilization are appropriate, the chromatic aberration increases in number when the zoom ratio is increased, and a large number of decentering aberrations occur particularly during the image stabilization, which greatly lowers the optical performance. Hence, in the zoom lens having the image stabilizing function with a high zoom ratio, it is important to appropriately set the entire zooming configuration, the lens configuration of the vibration isolation unit, and the like.

For example, it is important to appropriately set the number of lens units that form the zoom lens, signs of the refractive powers of the lens units, selection of the lens unit configured to move for zooming, the lens configuration of the vibration isolation unit, and the like. The lack of appropriate settings of those configurations results in an extreme difficulty in making the entire system of the zoom lens smaller in size, securing the high zoom ratio, and maintaining the high optical performance during the image stabilization.

SUMMARY OF THE INVENTION

The present invention has an object to provide a zoom lens, which is entirely small in size with a high zoom ratio, and is configured to satisfactorily correct aberration variations during image blur correction and to exhibit high optical performance even during image stabilization. According to one embodiment of the present invention, there is provided a zoom lens including:

a first lens unit having a positive refractive power;
a second lens unit having a negative refractive power;
a third lens unit having a positive refractive power;
a fourth lens unit having a positive refractive power; and
a rear lens unit including at least one lens unit, which are arranged in order from an object side to an image side so that an interval between each pair of adjacent lens units is changed during zooming, in which:

the rear lens unit is formed of a front-side subunit having a negative refractive power and a rear-side subunit having a positive refractive power, which are arranged in order from the object side to the image side;
the front-side subunit is configured to move in a direction having a component in a direction perpendicular to an optical axis during image blur correction;
the front-side subunit includes at least one positive lens and at least one negative lens; and
the following conditional expressions are satisfied:

$$0.3<|f51P\times(n51P-1)/f51|<0.8;$$

$$1.8<n51P;$$

$$1.8<n51N;$$

$$v51P<30.0; \text{ and}$$

$$v51N<30.0,$$

where f51 represents a focal length of the front-side subunit, f51P represents a focal length of one positive lens (G51P) of the at least one positive lens included in the front-side subunit, n51P and v51P represent a refractive index and an Abbe number, respectively, of a material of the positive lens (G51P), n51N and v51N represent a refractive index and an Abbe number, respectively, of a material of one negative lens (G51N) of the at least one negative lens included in the front-side subunit.

According to one embodiment of the present invention, there is provided a zoom lens including:
a first lens unit having a positive refractive power;
a second lens unit having a negative refractive power;
a third lens unit having a positive refractive power;
a fourth lens unit having a positive refractive power; and
a rear lens unit including at least one lens unit, which are arranged in order from an object side to an image side, in which:
the rear lens unit includes:
a fifth lens unit having a positive or negative refractive power; and
a sixth lens unit having a positive refractive power, which are arranged in order from the object side to the image side;
the zoom lens is configured so that an interval between each pair of adjacent lens units is changed during zooming;
the fifth lens unit includes at least one positive lens and at least one negative lens, and is configured to move in a direction having a component in a direction perpendicular to an optical axis during image blur correction; and
the following conditional expressions are satisfied:

$$0.3<|f5P\times(n5P-1)/f5|<0.8;$$

$$1.8<n5P;$$

$$1.8<n5N;$$

$$v5P<30.0; \text{ and}$$

$$v5N<30.0,$$

where f5 represents a focal length of the fifth lens unit, f5P represents a focal length of one positive lens (G5P) of the at least one positive lens included in the fifth lens unit, n5P and v5P represent a refractive index and an Abbe number, respectively, of a material of the positive lens (G5P), and n5N and v5N represent a refractive index and an Abbe number, respectively, of a material of one negative lens (G5N) of the at least one negative lens included in the fifth lens unit.

According to the present invention, there can be obtained the zoom lens, which is entirely small in size with the high zoom ratio, and is configured to satisfactorily correct aberration variations during the image blur correction and to exhibit the high optical performance even during the image stabilization.

Further features of the present invention will become apparent from the following description of exemplary embodiments with reference to the attached drawings.

BRIEF DESCRIPTION OF THE DRAWINGS

FIG. 2A is a longitudinal aberration diagram at the wide angle end of the zoom lens according to Example 1.

FIG. 2B is a longitudinal aberration diagram at the intermediate zoom position (focal length of 40 mm) of the zoom lens according to Example 1.

FIG. 2C is a longitudinal aberration diagram at the telephoto end of the zoom lens according to Example 1.

DESCRIPTION OF THE EMBODIMENTS

In the following, exemplary embodiments of the present invention are described in detail with reference to the attached drawings. The zoom lens of the present invention includes: a first lens unit having a positive refractive power; a second lens unit having a negative refractive power; a third lens unit having a positive refractive power; a fourth lens unit having a positive refractive power; and a rear lens unit including at least one lens unit, which are arranged in order from an object side to an image side. An interval between each pair of adjacent lens units is changed during zooming. The rear lens unit includes a vibration isolation unit configured to move in a direction having a component in a direction perpendicular to an optical axis during image blur correction.

Figure 1A:
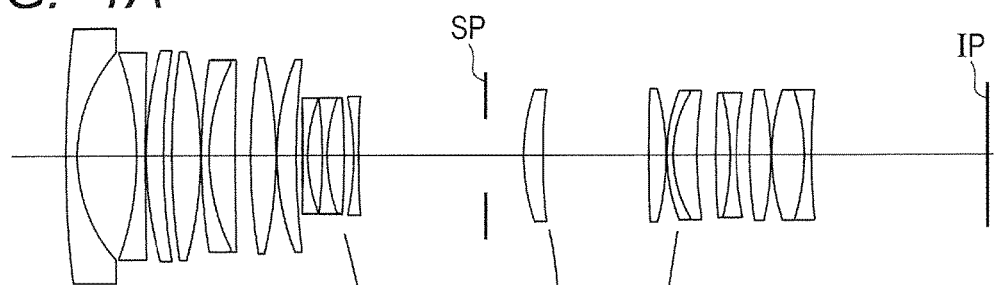
FIG. 1A is a lens cross-sectional view of a zoom lens at a wide angle end according to Example 1 of the present invention.
Figure 1B:
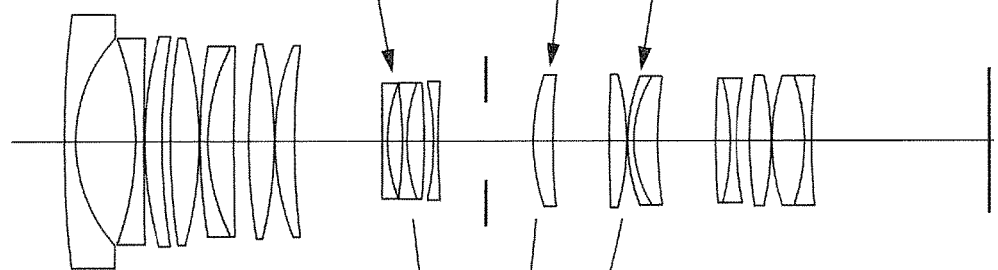
FIG. 1B is a lens cross-sectional view of the zoom lens at an intermediate zoom position (focal length of 40 mm) according to Example 1.
Figure 1C:
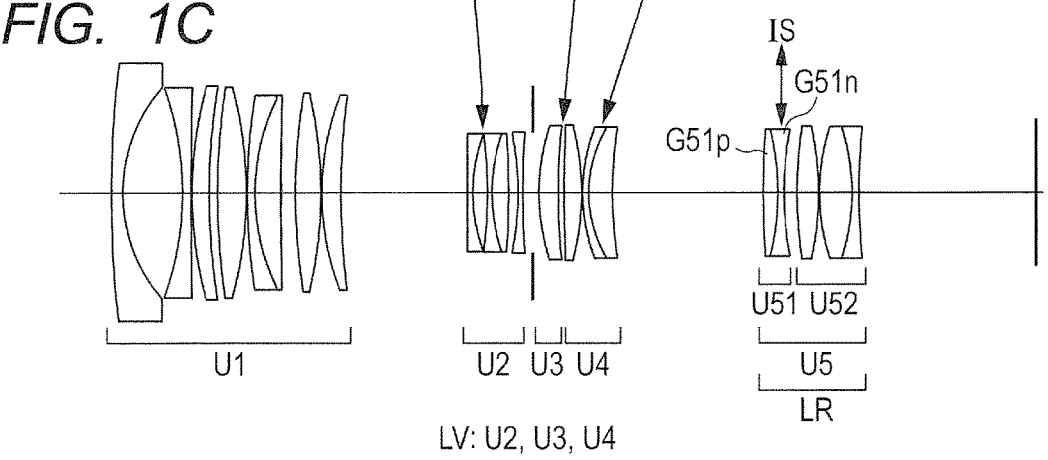
FIG. 1C is a lens cross-sectional view of the zoom lens at a telephoto end according to Example 1.
Figure 3A:
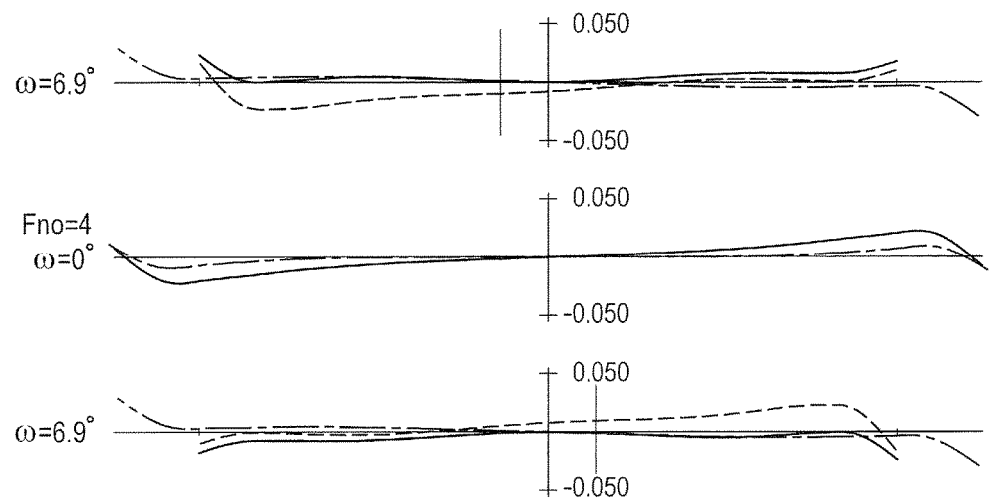
FIG. 3A is a lateral aberration diagram at the telephoto end of the zoom lens before image blur correction according to Example 1.
Figure 3B:
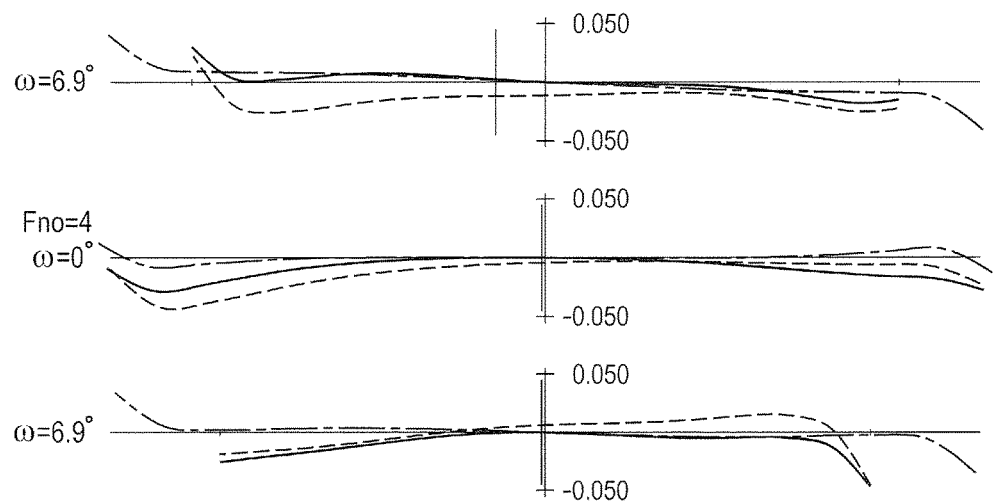
FIG. 3B is a lateral aberration diagram at the telephoto end of the zoom lens after the image blur correction according to Example 1.

FIG. 1A, FIG. 1B, and FIG. 1C are lens cross-sectional views of a zoom lens at a wide angle end (short focal length end), an intermediate zoom position (focal length of 40 mm), and a telephoto end (long focal length end), respectively, according to Example 1 of the present invention. FIG. 2A, FIG. 2B, and FIG. 2C are longitudinal aberration diagrams of the zoom lens at the wide angle end, the intermediate zoom position, the telephoto end, respectively, according to Example 1. FIG. 3A and FIG. 3B are lateral aberration diagrams at the telephoto end before the image blur correction and after the image blur correction, respectively, according to Example 1 of the present invention.

The lateral aberration diagrams after the image blur correction are graphs for showing aberrations in a correction state in which a front fifth subunit U51 for image blur correction described later is driven by ±1.5 mm as a movement component perpendicular to the optical axis. The lateral aberration diagrams indicate positions at the peripheral image height +70%, the center, and the peripheral image height −70%. This applies to the following lateral aberration diagrams. The peripheral image height referred to herein is represented by a ratio of an evaluation image height assuming that a maximum image circle is 100%, and the signs "+" and "−" indicate that the image heights are diametrically opposed to each other with respect to an image plane center. This applies to the following lateral aberration diagrams. The zoom lens according to Example 1 has a zoom ratio of 4.74 and an f-number of 4.00.

Figure 4A:
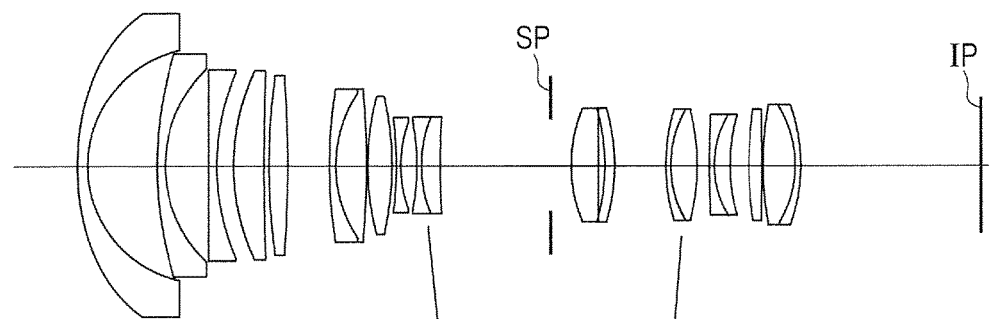
FIG. 4A is a lens cross-sectional view of a zoom lens at a wide angle end according to Example 2 of the present invention.
Figure 4B:
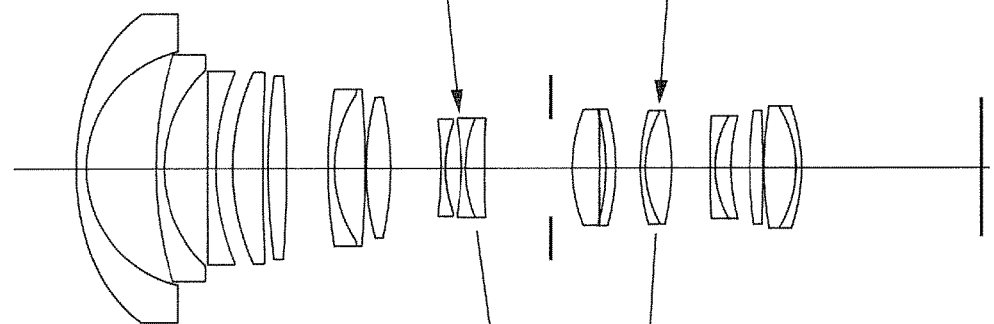
FIG. 4B is a lens cross-sectional view of the zoom lens at an intermediate zoom position (focal length of 21 mm) according to Example 2.
Figure 4C:
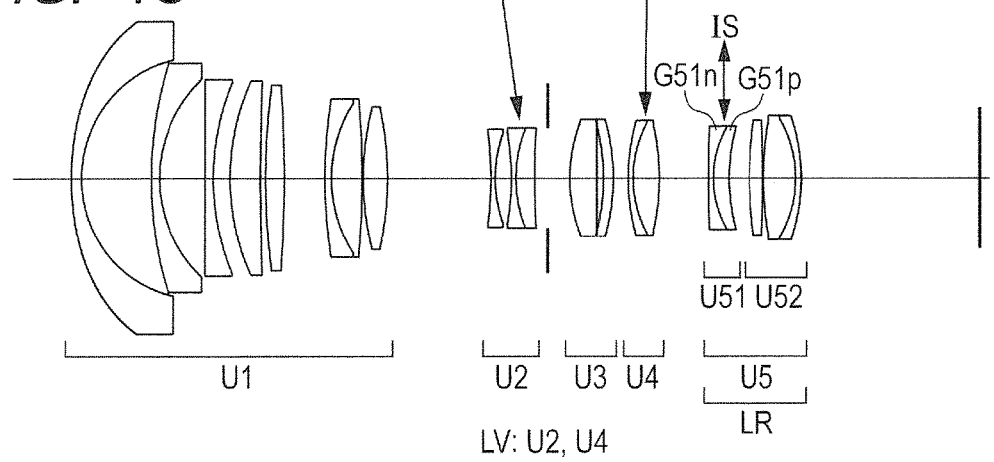
FIG. 4C is a lens cross-sectional view of the zoom lens at a telephoto end according to Example 2.
Figure 5A:
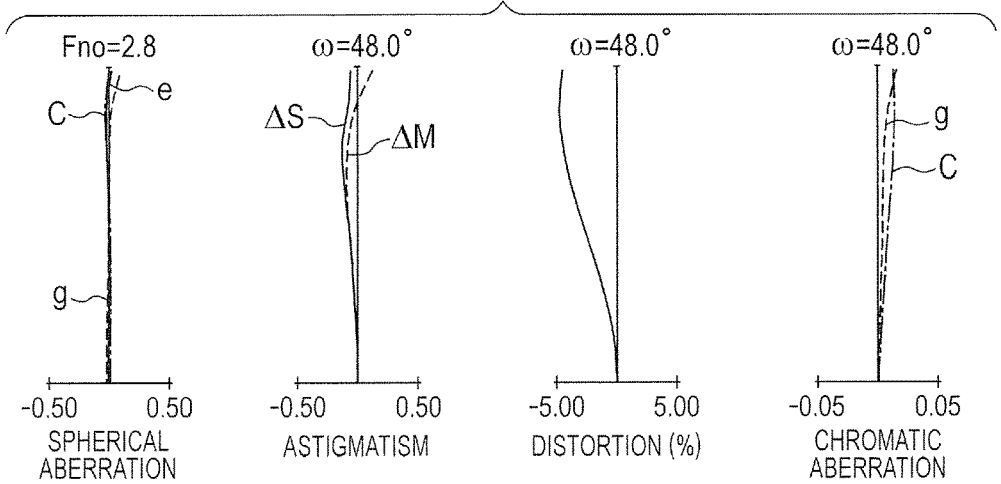
FIG. 5A is a longitudinal aberration diagram at the wide angle end of the zoom lens according to Example 2.
Figure 5B:
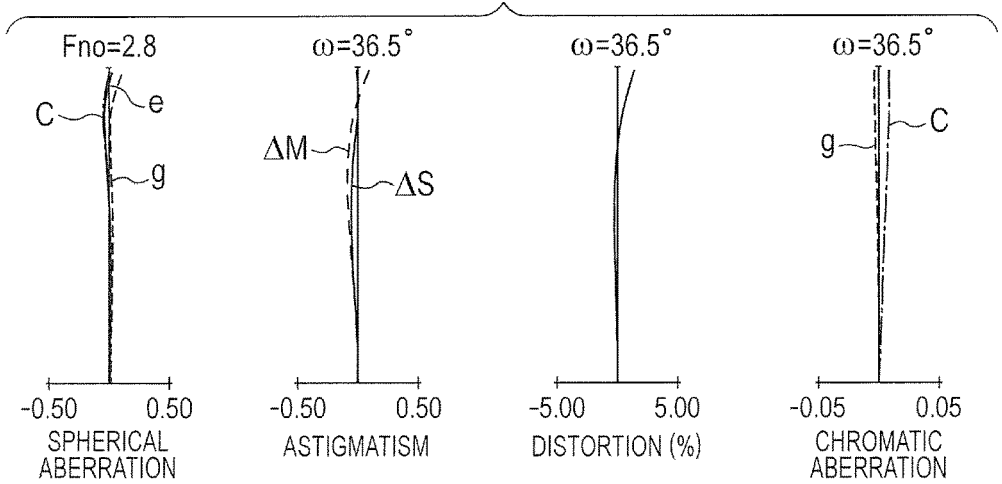
FIG. 5B is a longitudinal aberration diagram at the intermediate zoom position (focal length of 21 mm) of the zoom lens according to Example 2.
Figure 5C:
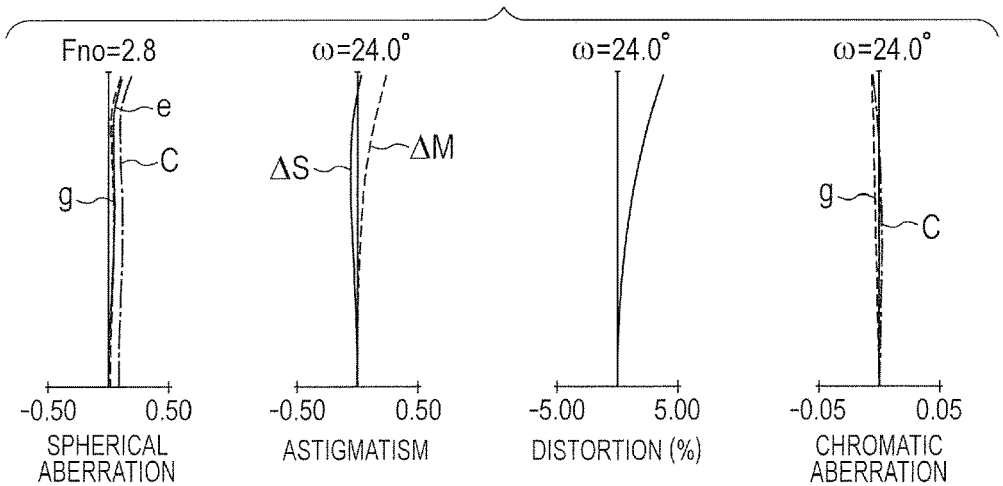
FIG. 5C is a longitudinal aberration diagram at the telephoto end of the zoom lens according to Example 2.
Figure 6A:
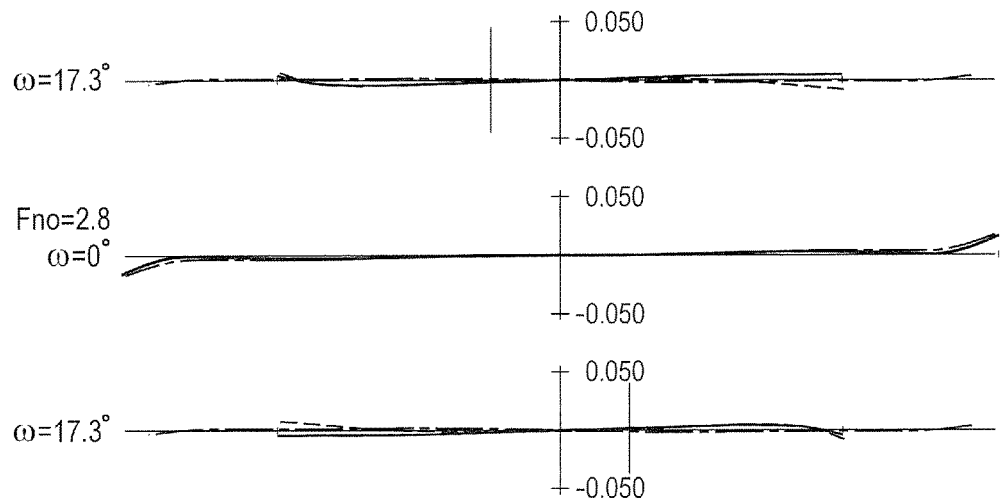
FIG. 6A is a lateral aberration diagram at the telephoto end of the zoom lens before image blur correction according to Example 2.
Figure 6B:
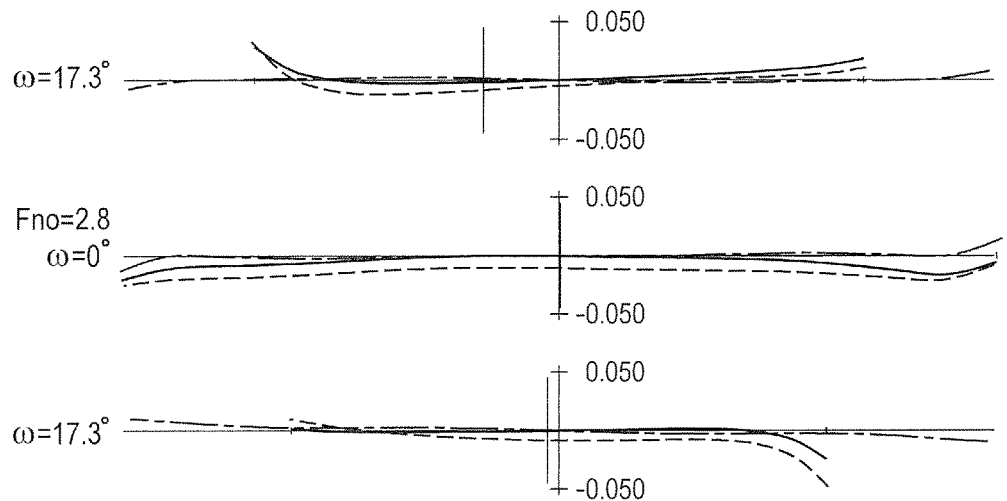
FIG. 6B is a lateral aberration diagram at the telephoto end of the zoom lens after the image blur correction according to Example 2.

FIG. 4A, FIG. 4B, and FIG. 4C are lens cross-sectional views of a zoom lens at a wide angle end, an intermediate zoom position (focal length of 21 mm), and a telephoto end, respectively, according to Example 2 of the present invention. FIG. 5A, FIG. 5B, and FIG. 5C are longitudinal aberration diagrams of the zoom lens at the wide angle end, the intermediate zoom position, the telephoto end, respectively, according to Example 2. FIG. 6A and FIG. 6B are lateral aberration diagrams at the telephoto end before the image blur correction and after the image blur correction, respectively, according to Example 2 of the present invention. The lateral aberration diagrams after the image blur correction are graphs for showing aberrations in a correction state in which a front fifth subunit U51 for image blur correction described later has a movement component of ±1.5 mm perpendicular to the optical axis. The zoom lens according to Example 2 has a zoom ratio of 2.50 and an f-number of 2.80.

Figure 7A:
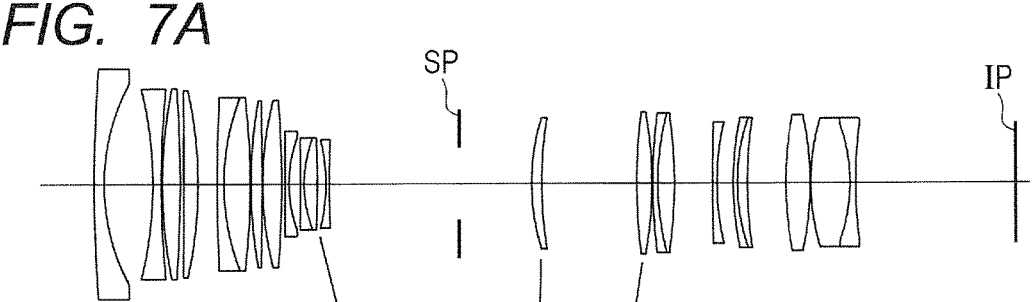
FIG. 7A is a lens cross-sectional view of a zoom lens at a wide angle end according to Example 3 of the present invention.
Figure 7B:
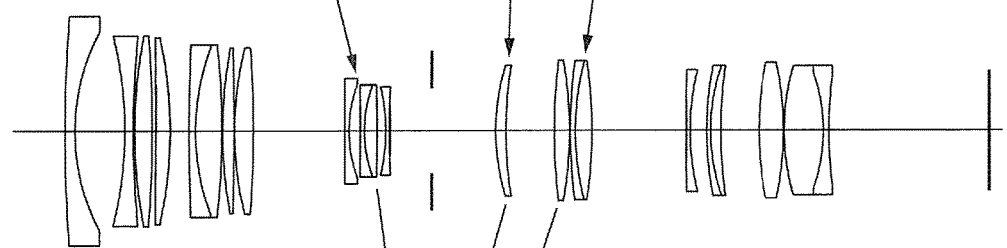
FIG. 7B is a lens cross-sectional view of the zoom lens at an intermediate zoom position (focal length of 70 mm) according to Example 3.
Figure 7C:
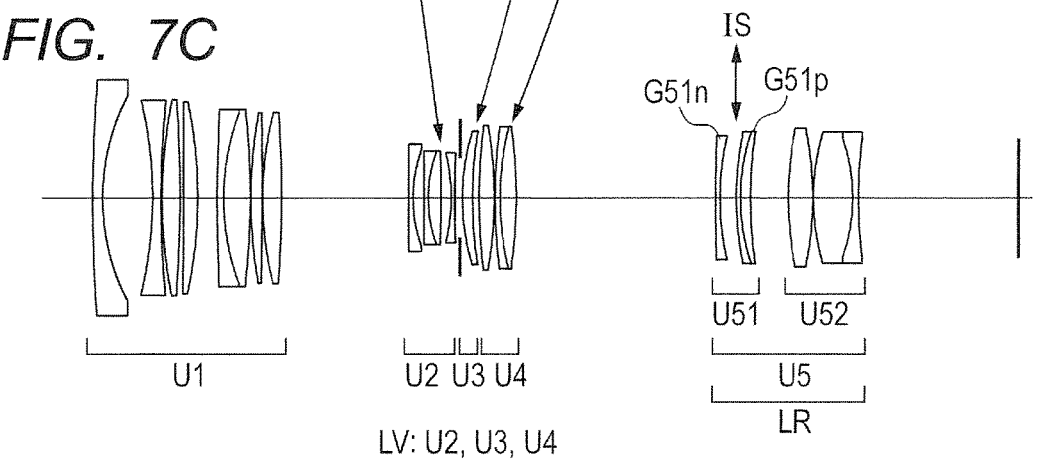
FIG. 7C is a lens cross-sectional view of the zoom lens at a telephoto end according to Example 3.
Figure 8A:
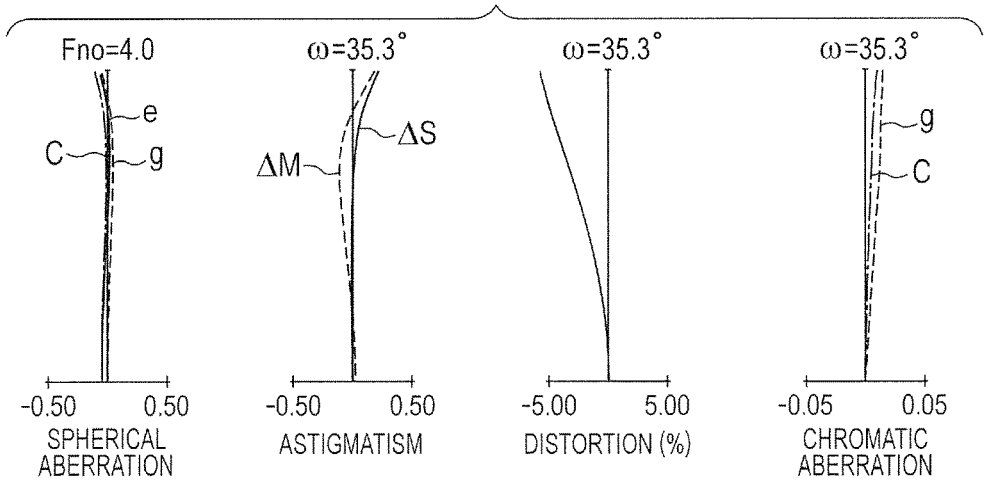
FIG. 8A is a longitudinal aberration diagram at the wide angle end of the zoom lens according to Example 3.
Figure 8B:
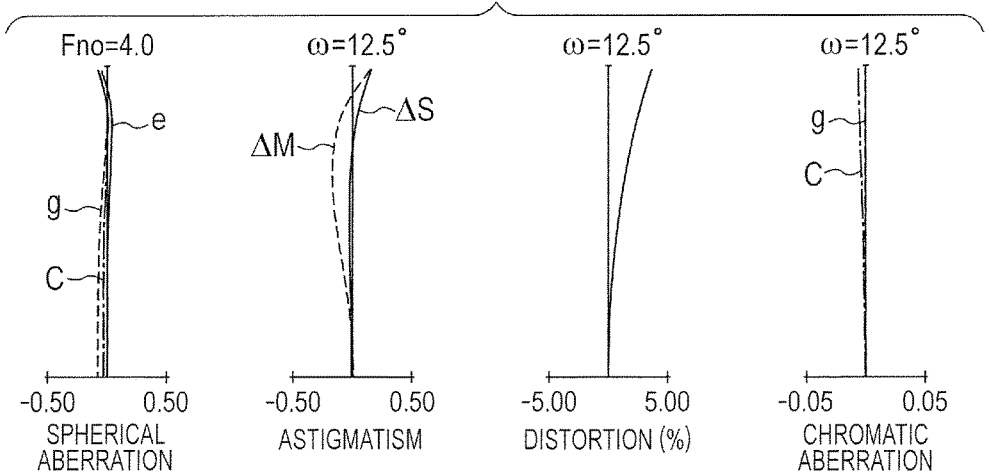
FIG. 8B is a longitudinal aberration diagram at the intermediate zoom position (focal length of 70 mm) of the zoom lens according to Example 3.
Figure 8C:
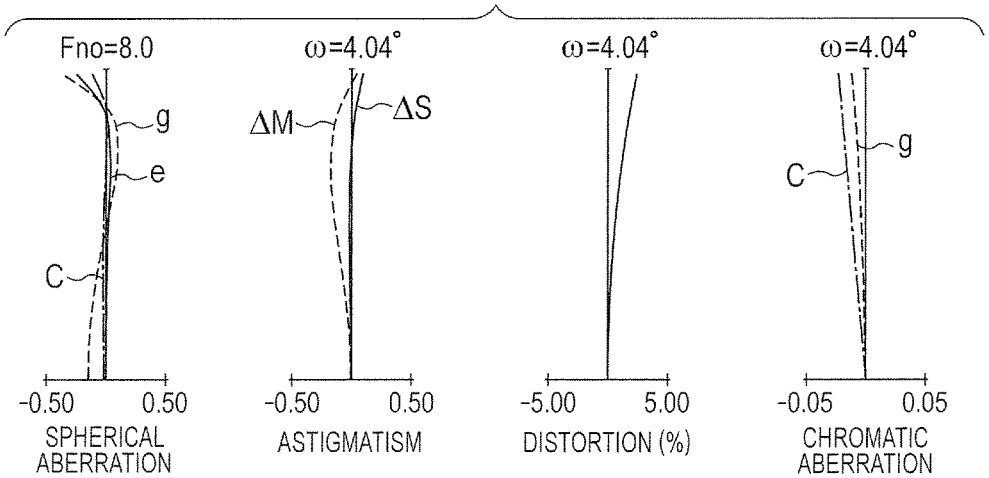
FIG. 8C is a longitudinal aberration diagram at the telephoto end of the zoom lens according to Example 3.

FIG. 7A, FIG. 7B, and FIG. 7C are lens cross-sectional views of a zoom lens at a wide angle end, an intermediate zoom position (focal length of 70 mm), and a telephoto end, respectively, according to Example 3 of the present invention. FIG. 8A, FIG. 8B, and FIG. 8C are longitudinal aberration diagrams of the zoom lens at the wide angle end, the intermediate zoom position, the telephoto end, respectively, according to Example 3.

Figure 9A:
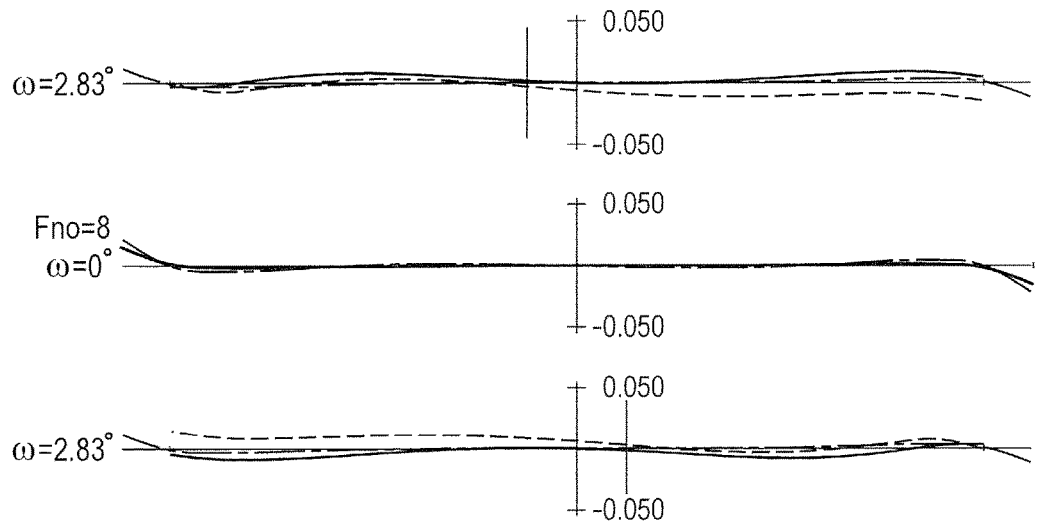
FIG. 9A is a lateral aberration diagram at the telephoto end of the zoom lens before image blur correction according to Example 3.
Figure 9B:
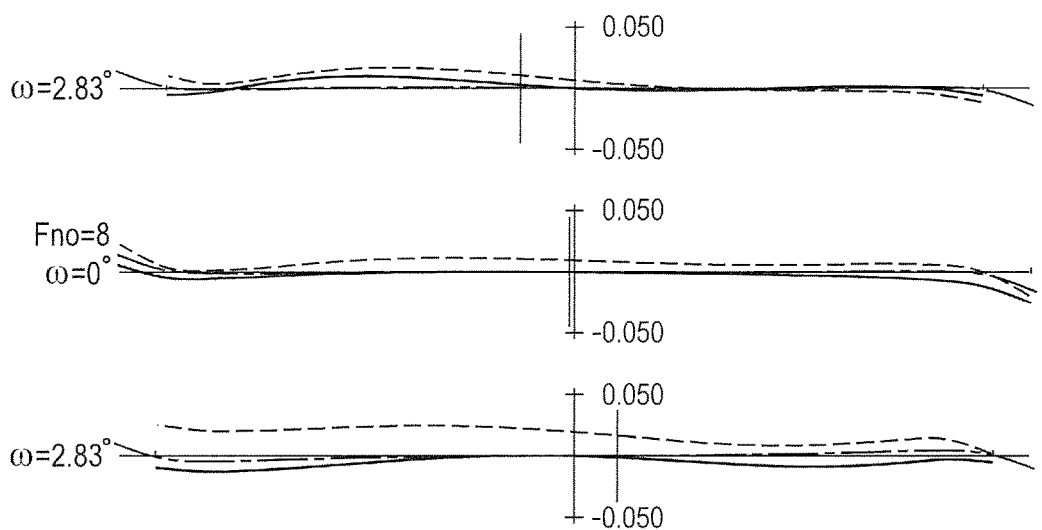
FIG. 9B is a lateral aberration diagram at the telephoto end of the zoom lens after the image blur correction according to Example 3.

FIG. 9A and FIG. 9B are lateral aberration diagrams at the telephoto end before the image blur correction and after the image blur correction according to Example 3 of the present invention. The lateral aberration diagrams after the image blur correction are graphs for showing aberrations in the correction state in which the front fifth subunit U51 for image blur correction described later is driven by ±1.5 mm as the movement component perpendicular to the optical axis. The zoom lens according to Example 3 has a zoom ratio of 10.0 and an f-number of from 4.00 to 8.00.

Figure 10A:
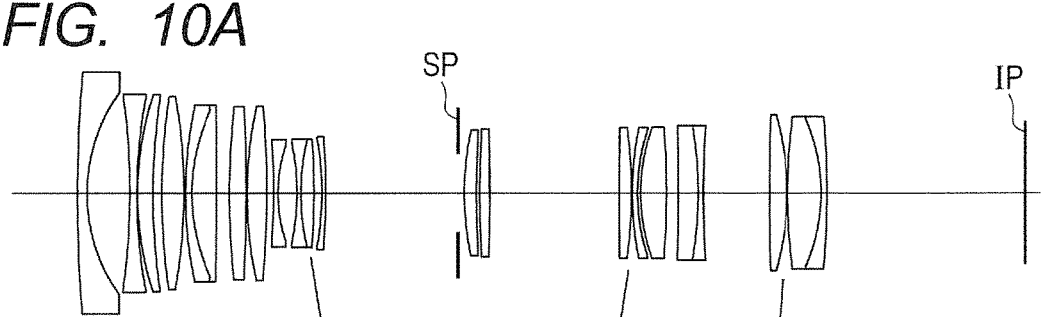
FIG. 10A is a lens cross-sectional view of a zoom lens at a wide angle end according to Example 4 of the present invention.
Figure 10B:
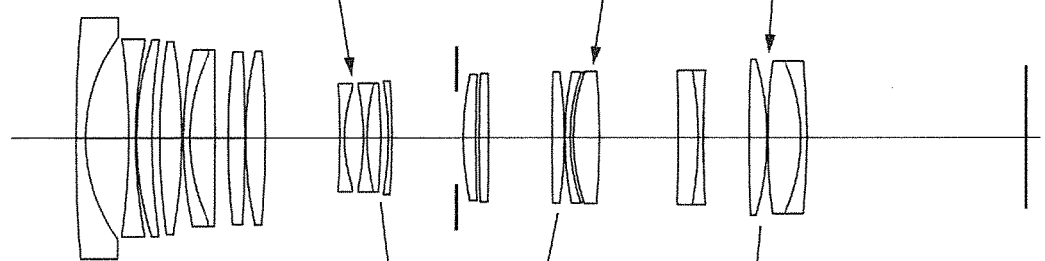
FIG. 10B is a lens cross-sectional view of the zoom lens at an intermediate zoom position (focal length of 40 mm) according to Example 4.
Figure 10C:
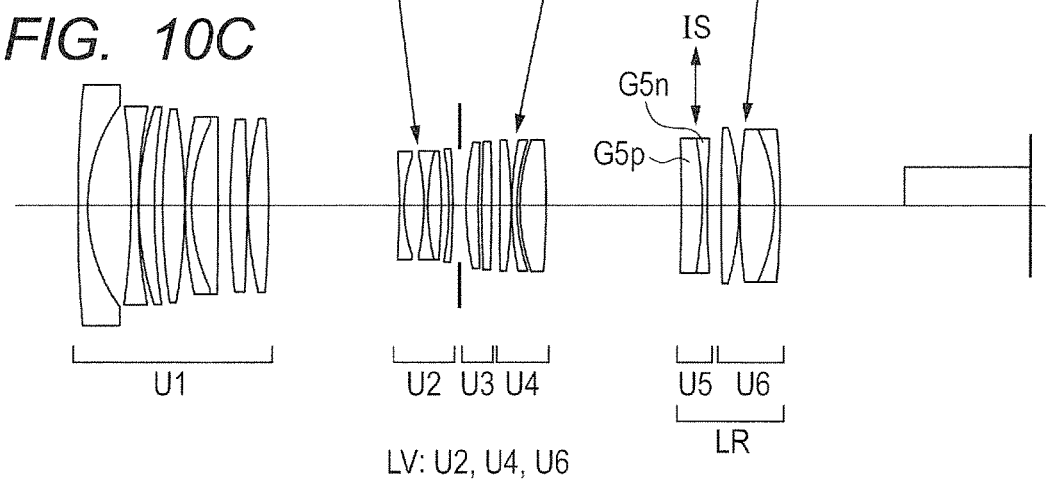
FIG. 10C is a lens cross-sectional view of the zoom lens at a telephoto end of according to Example 4.
Figure 11A:
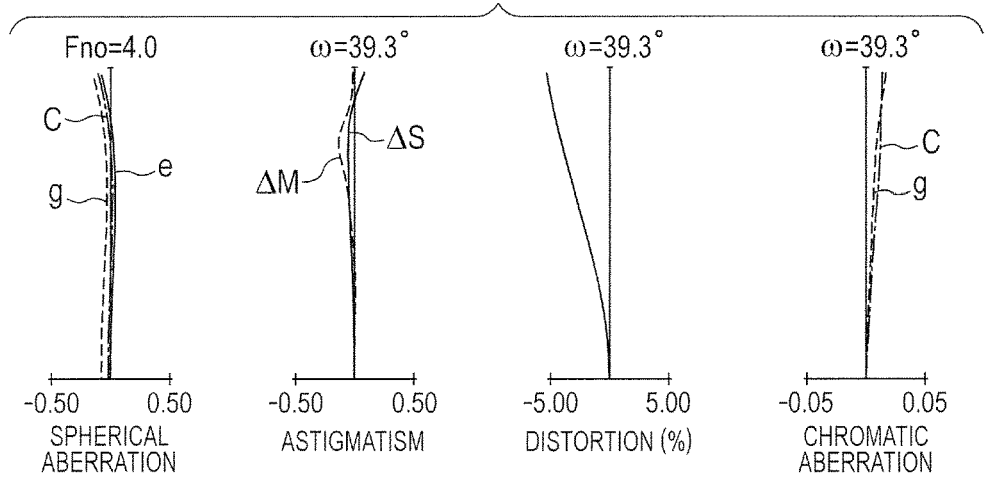
FIG. 11A is a longitudinal aberration diagram at the wide angle end of the zoom lens according to Example 4.
Figure 11B:
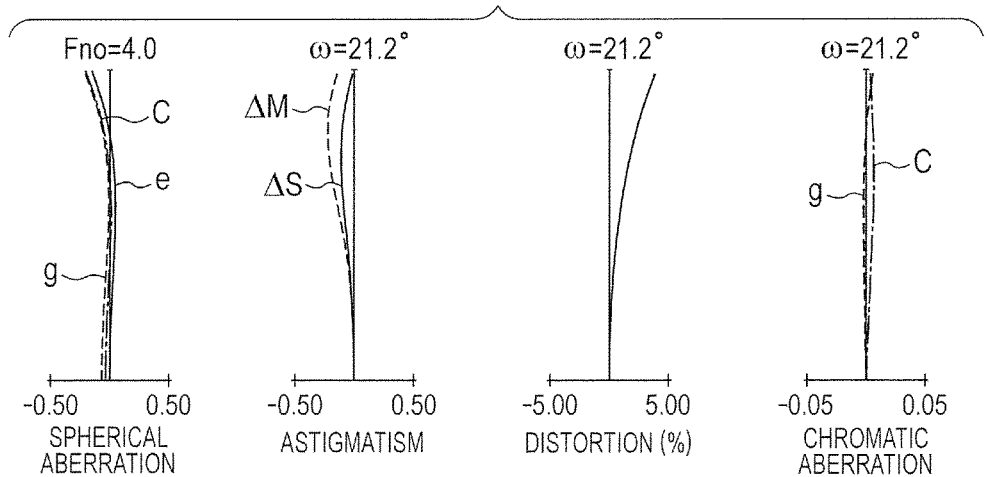
FIG. 11B is a longitudinal aberration diagram at the intermediate zoom position (focal length of 40 mm) of the zoom lens according to Example 4.
Figure 11C:
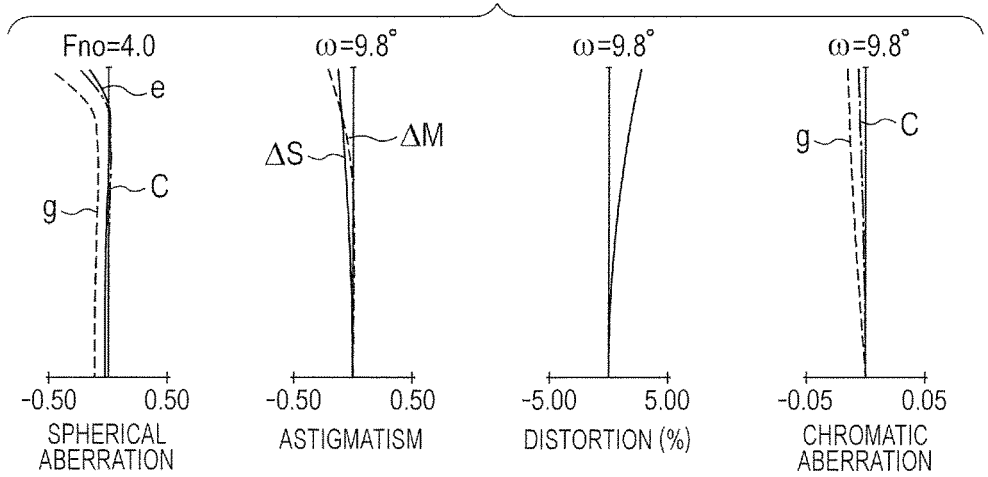
FIG. 11C is a longitudinal aberration diagram at the telephoto end of the zoom lens according to Example 4.

FIG. 10A, FIG. 10B, and FIG. 10C are lens cross-sectional views of a zoom lens at a wide angle end, an intermediate zoom position (focal length of 40 mm), and a telephoto end, respectively, according to Example 4 of the present invention. FIG. 11A, FIG. 11B, and FIG. 11C are longitudinal aberration diagrams of the zoom lens at the wide angle end, the intermediate zoom position, the telephoto end, respectively, according to Example 4.

Figure 12A:
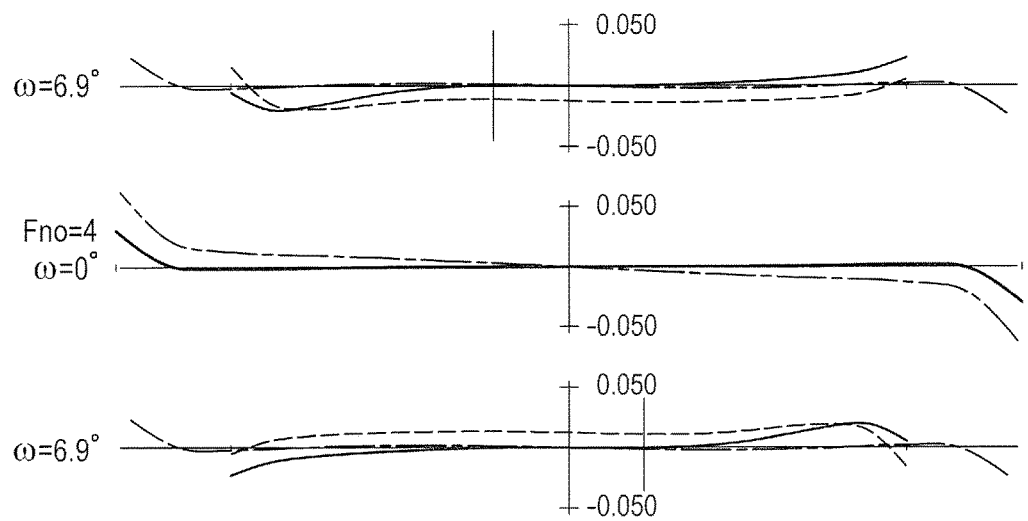
FIG. 12A is a lateral aberration diagram at the telephoto end of the zoom lens before image blur correction according to Example 4.
Figure 12B:
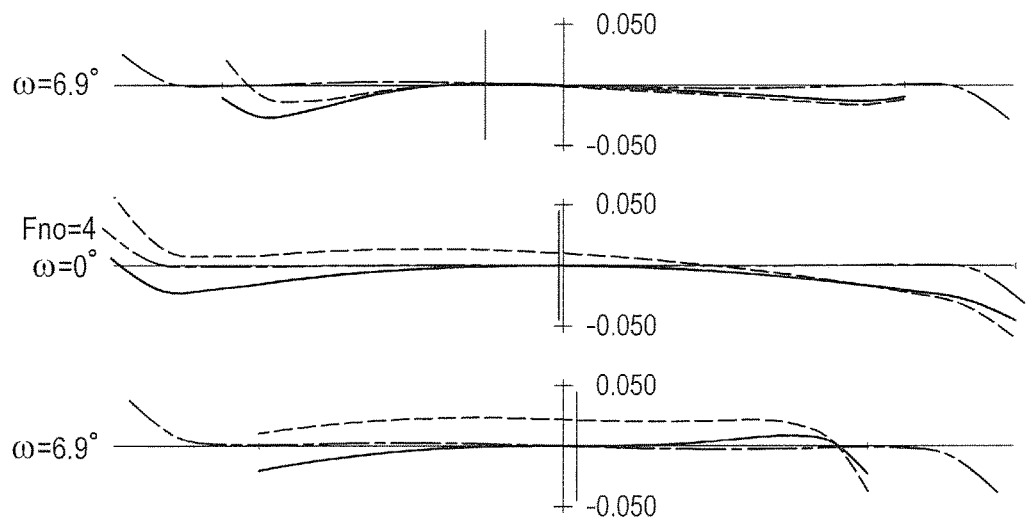
FIG. 12B is a lateral aberration diagram at the telephoto end of the zoom lens after the image blur correction according to Example 4.

FIG. 12A and FIG. 12B are lateral aberration diagrams at the telephoto end before the image blur correction, respectively, and after the image blur correction according to Example 4 of the present invention. The lateral aberration diagrams after the image blur correction are graphs for showing aberrations in the correction state in which a fifth lens unit U5 for image blur correction described later is driven by ±1.5 mm as the movement component perpendicular to the optical axis. The zoom lens according to Example 4 has a zoom ratio of 4.74 and an f-number of 4.00.

Figure 13:
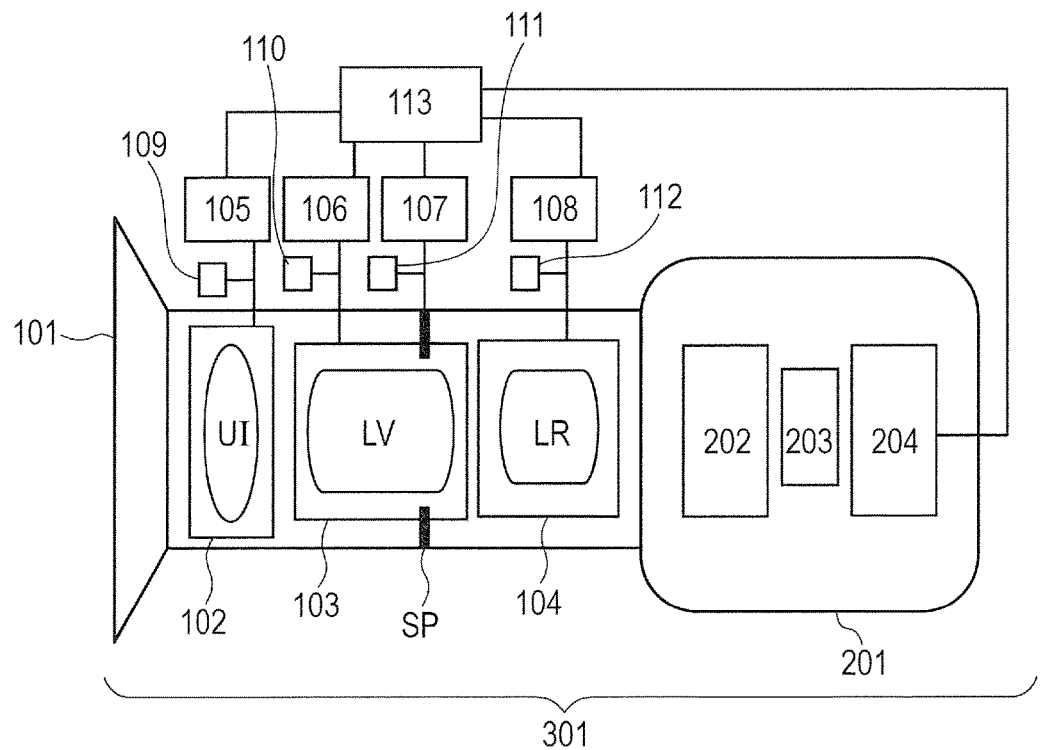
FIG. 13 is a schematic diagram of an image pickup apparatus of the present invention.
Figure 14:
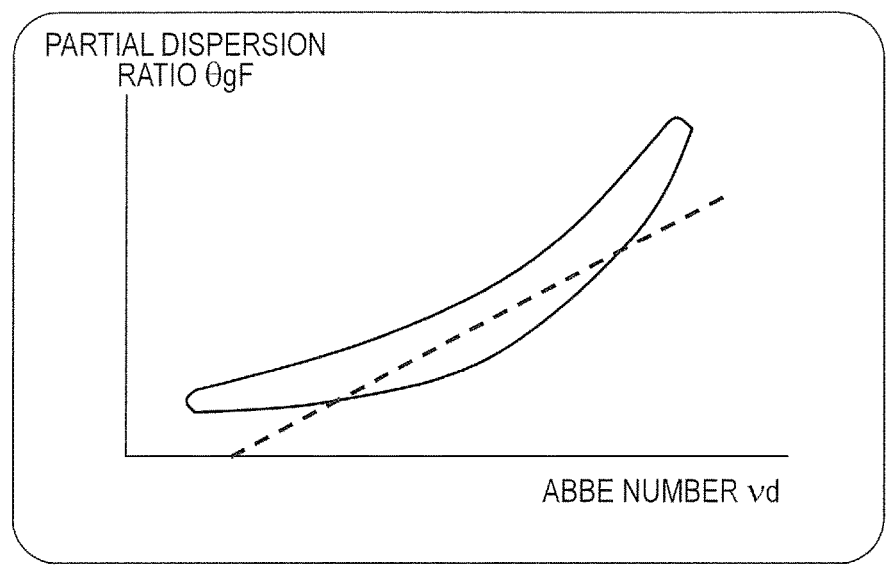
FIG. 14 is a schematic graph for showing a relationship between an Abbe number vd and a partial dispersion ratio θgF of an optical material.
Figure 15:
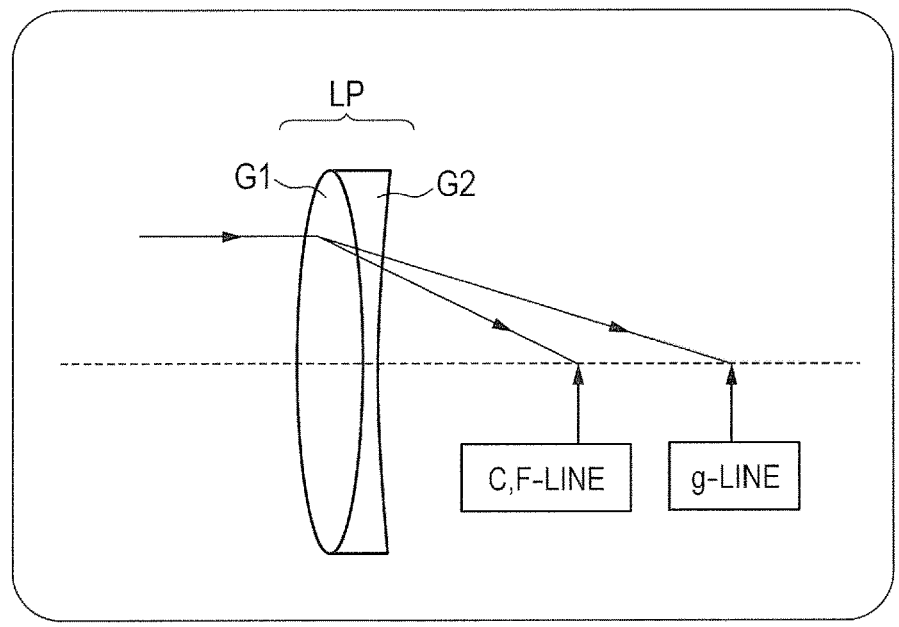
FIG. 15 is a schematic diagram for illustrating chromatic aberration correction of a cemented lens having a positive refractive power.
Figure 16:
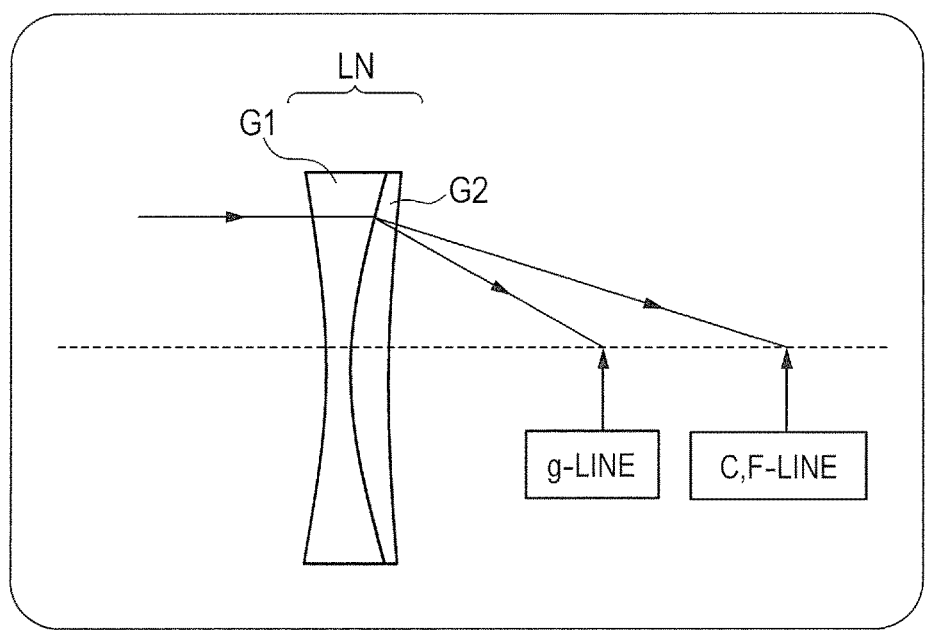
FIG. 16 is a schematic diagram for illustrating chromatic aberration correction of a cemented lens having a negative refractive power.

FIG. 13 is a schematic diagram of an image pickup apparatus according to one embodiment of the present invention. FIG. 14 is a schematic graph for showing a relationship between an Abbe number νd and a partial dispersion ratio θgF of an optical material. FIG. 15 is a schematic diagram for illustrating chromatic aberration correction of a cemented lens having a positive refractive power. FIG. 16 is a schematic diagram for illustrating chromatic aberration correction of a cemented lens having a negative refractive power.

The zoom lens according to the present invention is to be used in an image pickup apparatus, e.g., a digital camera, a video camera, or a silver-halide film camera. In the lens cross-sectional views, the left side is a front side (object side, enlarging side), and the right side is a rear side (image side, reducing side). In the lens cross-sectional views, the order of each of the lens units from the object side to the image side is indicated by i, and the i-th lens unit is indicated by Ui.

A vibration isolation unit IS for image blur correction is configured to move so as to have a component in a direction perpendicular to the optical axis, and to shift an image position (imaging position) along the optical axis direction. An f-number determining member (hereinafter also referred to as "aperture stop") SP functions as an aperture stop configured to determine (restrict) an open f-number (Fno) light flux, and is positioned on an object side of a third lens unit U3. An image plane IP corresponds to an image pickup surface of an image pickup element (photo-electric conversion element), e.g., a CCD sensor and a CMOS sensor when the zoom lens is used as a photographing optical system of a video camera or a digital still camera. Alternatively, the image plane IP corresponds to a photosensitive surface corresponding to a film surface when the zoom lens is used as a photographing optical system of a silver-halide film camera.

The arrows indicate movement loci of the lens units during zooming from the wide angle end to the telephoto end. The arrow accompanying the vibration isolation unit IS indicates a direction to move with respect to the optical axis during image blur correction. The aberration diagram uses an e-line (wavelength: 546.1 nm) as a reference. Of the longitudinal aberration diagrams, in the spherical aberration, an e-line, a g-line (wavelength: 435.8 nm), and a C-line (wavelength: 656.3 nm) are represented by e, g, and C, respectively. In the astigmatism, an e-line meridional image plane and an e-line sagittal image plane are represented by ΔM and ΔS, respectively. The lateral chromatic aberration is shown by the g-line and the C-line. An f-number and a photographing half angle of field (degrees) are represented by Fno and ω, respectively.

In the longitudinal aberration diagrams, the spherical aberration, the astigmatism, the distortion, and the lateral chromatic aberration are drawn on the scales of 0.5 mm, 0.5 mm, 5%, and 0.05 mm, respectively. The lateral aberration diagrams are drawn on the scale of 0.05 mm. In each of Examples described below, the wide angle end and the telephoto end represent zoom positions exhibited when the second lens unit for varying a magnification is positioned at both ends of a range that allows mechanical movement on the optical axis.

The zoom lens according to one embodiment of the present invention includes the first lens unit having a positive refractive power, the second lens unit having a negative refractive power, the third lens unit having a positive refractive power, the fourth lens unit having a positive refractive power, the rear lens unit including at least one lens unit, which are arranged in order from an object side to an image side.

At least the second lens unit and the fourth lens unit are configured to move for zooming so that an interval between each pair of adjacent lens units is changed as a whole zoom lens. The rear lens unit includes a front-side subunit (front fifth subunit) having a negative refractive power and a rear-side subunit (rear fifth subunit) having a positive refractive power, which are arranged in order from the object side to the image side. The front fifth subunit serving as a vibration isolation unit is configured to move in the direction having the component in the direction perpendicular to the optical axis during image blur correction. The front fifth subunit includes at least one positive lens and at least one negative lens.

A focal length of the front fifth subunit and a focal length of one positive lens G51P of the positive lenses included in the front fifth subunit are represented by f51 and f51P, respectively. A refractive index and an Abbe number of a material of the positive lens G51P are represented by n51P and ν51P, respectively. A refractive index and an Abbe number of a material of one negative lens G51N of the negative lenses included in the front fifth subunit are represented by n51N and ν51N, respectively.

In this case, the following conditional expressions are satisfied.

$$0.3 < |f51P \times (n51P-1)/f51| < 0.8 \quad (1X)$$

$$1.8 < n51P \quad (2X)$$

$$1.8 < n51N \quad (3X)$$

$$\nu 51P < 30.0 \quad (4X)$$

$$\nu 51N < 30.0 \quad (5X)$$

It is preferred to satisfy at least one of the following conditional expressions.

A partial dispersion ratio of the material of the positive lens G51P and a partial dispersion ratio of the material of the negative lens G51N are represented by θ51P and θ51N, respectively. Unit intervals between the fourth lens unit and a fifth lens unit at the wide angle end and the telephoto end are represented by D4wX and D4tX, respectively. In this case, it is desired to satisfy at least one of the following conditional expressions.

$$2.5 \times 10^{-3} < (\theta 51P - \theta 51N)/(\nu 51N - \nu 51P) \quad (6X)$$

$$0.04 < D4wX/D4tX < 0.40 \quad (7X)$$

In addition, it is desired that the front fifth subunit consists of one positive lens and one negative lens, or that the front fifth subunit consists of one positive lens and two negative lenses. Further, it is desired that the rear fifth subunit include at least one positive lens and at least one negative lens. In addition, the zoom lens according to one embodiment of the present invention includes the first lens unit having a positive refractive power, the second lens unit having a negative refractive power, the third lens unit having a positive refractive power, the fourth lens unit having a positive refractive power, and the rear lens unit including at least one lens unit, which are arranged in order from the object side to the image side.

The rear lens unit includes the fifth lens unit having a positive or negative refractive power and a sixth lens unit having a positive refractive power, which are arranged in order from the object side to the image side. Further, an interval between each pair of adjacent lens units is changed during zooming. The fifth lens unit serving as a vibration isolation unit is configured to move in the direction having the component in the direction perpendicular to the optical axis during image blur correction. The fifth lens unit includes at least one positive lens and at least one negative lens.

A focal length of the fifth lens unit and a focal length of one positive lens G5P of the at least one positive lens included in the fifth lens unit are represented by f5 and f5P, respectively. A refractive index and an Abbe number of a material of the positive lens G5P are represented by n5P and ν5P, respectively. A refractive index and an Abbe number of a material of one negative lens G5N of the at least one negative lens included in the fifth lens unit are represented by n5N and ν5N, respectively.

In this case, the following conditional expressions are satisfied.

$$0.3 < |f5P \times (n5P-1)/f5| < 0.8 \quad (1Y)$$

$$1.8 < n5P \quad (2Y)$$

$$1.8 < n5N \quad (3Y)$$

$$\nu 5P < 30.0 \quad (4Y)$$

$$\nu 5N < 30.0 \quad (5Y)$$

It is preferred to satisfy at least one of the following conditional expressions.

A partial dispersion ratio of the material of the positive lens G5P and a partial dispersion ratio of the material of the negative lens G5N are represented by θ5P and θ5N, respectively. Unit intervals between the fourth lens unit and the fifth lens unit at the wide angle end and the telephoto end are represented by D4wY and D4tY, respectively. In this case, it is desired to satisfy at least one of the following conditional expressions.

$$2.5 \times 10^{-3} < (\theta 5P - \theta 5N)/(\nu 5N - \nu 5P) \quad (6Y)$$

$$0.04 < D4wY/D4tY < 0.40 \quad (7Y)$$

In addition, the fifth lens unit has a feature that the fifth lens unit includes one positive lens and one negative lens. Further, it is desired that the sixth lens unit include at least one positive lens and at least one negative lens. In this case, the conditional expressions (1X) to (7X) are used when the zoom lens according to one embodiment of the present invention consists of five lens units as a whole as described in Examples 1 to 3 and the image blur correction is conducted with the front fifth subunit U51 (vibration isolation unit IS) having a negative refractive power which is a part of the fifth lens unit U5.

Meanwhile, the conditional expressions (1Y) to (7Y) are used when the zoom lens according to one embodiment of the present invention consists of six lens units as a whole as described in Example 4 and the image blur correction is conducted with the fifth lens unit U5 (vibration isolation unit IS) having a negative refractive power. In this case, the conditional expressions (1X) to (7X) correspond to the conditional expressions (1Y) to (7Y), respectively, in terms of technical aspects.

Therefore, in the following description, the conditional expression (1X) and the conditional expression (1Y) are referred to as "conditional expression (1)", the conditional expression (2X) and the conditional expression (2Y) are referred to as "conditional expression (2)", the conditional expression (3X) and the conditional expression (3Y) are referred to as "conditional expression (3)", the conditional expression (4X) and the conditional expression (4Y) are referred to as "conditional expression (4)", and the conditional expression (5X) and the conditional expression (5Y) are referred to as "conditional expression (5)".

Further, in the following description, the conditional expression (6X) and the conditional expression (6Y) are referred to as "conditional expression (6)" and the conditional expression (7X) and the conditional expression (7Y) are referred to as "conditional expression (7)".

Next, the technical meanings of the above-mentioned conditional expressions are described. The conditional expressions (1) to (5) define the refractive powers and characteristics of materials of the positive lens and the negative lens included in the vibration isolation unit IS. The vibration isolation unit IS of the zoom lens according to one embodiment of the present invention includes a cemented lens of a positive lens and a negative lens, and is configured to satisfactorily correct a decentering chromatic aberration that occurs during image stabilization while being made smaller in size and more lightweight to alleviate a drive load. The fourth lens unit arranged on the object side of the vibration isolation unit IS has a positive refractive power, and hence an angle αp of incidence of a light flux with respect to the vibration isolation unit IS becomes convergent.

The vibration isolation unit IS has a negative refractive power as a whole. Therefore, a curvature of a concave surface included in the vibration isolation unit IS necessarily becomes stronger, and the concave surface tends to have a high decentering aberration sensitivity. In order to suppress an occurrence of a decentering aberration during image stabilization, a lens surface for canceling the decentering aberration that occurs in the above-mentioned concave surface needs to be provided within the vibration isolation unit IS. In each of Examples, a cemented lens surface between the positive lens and the negative lens or the concave surface of the negative lens corresponds to the lens surface for the canceling.

Incidentally, the positive lens included in the vibration isolation unit IS also plays a role of reducing a secondary spectrum of the lateral chromatic aberration at the wide angle end in terms of aberration correction when there is no decentering, and it is preferred that a material having a high refractive index, a high dispersion, and a high partial dispersion ratio be selected for the positive lens. In this case, in order to conduct the correction of the lateral chromatic aberration and the correction of the decentering aberration with an appropriate curvature maintained for the cemented lens surface between the positive lens and the negative lens, a material having a low partial dispersion ratio while having a high refractive index and a high dispersion needs to be selected for a material of the negative lens.

Here, the partial dispersion ratio θgF and the Abbe number νd of the material of optical elements (lenses) used in each of Examples are as follows. Refractive indexes for the g-line (435.8 nm), the F-line (486.1 nm), the d-line (587.6 nm), and the C-line (656.3 nm) of Fraunhofer lines are represented by Ng, NF, Nd, and NC, respectively. At this time, the Abbe number νd and the partial dispersion ratio θgF for the g-line and the F-line are given as follows.

$$\nu d = (Nd-1)/(NF-NC) \quad (p)$$

$$\theta gF = (Ng-NF)/(NF-NC) \quad (q)$$

In each of Examples, such materials as to satisfy the conditional expressions (2) to (5) are employed for the vibration isolation unit to effectively conduct the chromatic aberration correction. FIG. 14 is a graph for showing a relationship between the Abbe number νd and the partial dispersion ratio θgF of an existing optical material. In FIG. 14, the partial dispersion ratio θgF approximately exhibits distribution in a narrow range with respect to the Abbe number νd. A chromatic aberration correction condition for a thin-contact lens system consists of two lenses G1 and G2 having refractive powers φ1 and φ2 and Abbe numbers ν1 and ν2 is expressed by the following expression.

$$\varphi 1/\nu 1+\varphi 2/\nu 2=E \tag{r}$$

Here, a combined refractive power φ is expressed by the following expression.

$$\varphi=\varphi 1+\varphi 2 \tag{s}$$

The same concept may apply to a configuration consists of three or more lenses.

In the expression (r), assuming that E=0, imaging positions of light of the C-line and the F-line coincide with each other in the chromatic aberration. In particular, in a zoom lens having high magnification, in order to suppress variations in the chromatic aberration during the zooming, the chromatic aberration of each lens unit, namely, E, is corrected to be close to zero.

In this case, a first lens unit U1 of the zoom lens assumed in one embodiment of the present invention is the lens unit having a positive refractive power. As illustrated in FIG. 15, in the correction of the chromatic aberration with a lens unit LP having a positive refractive power, a small chromatic aberration is achieved by using a material having a large Abbe number ν1 for the lens G1 having a positive refractive power and a material having a small Abbe number ν2 for the lens G2 having a negative refractive power.

Therefore, as understood from FIG. 15, with a partial dispersion ratio θ1 of the positive lens G1 being small and a partial dispersion ratio θ2 of the negative lens G2 being large, an imaging point of the g-line is deviated toward an image plane side when the chromatic aberration is corrected with the F-line and the C-line. Assuming that the above-mentioned deviation amount obtained when a light flux is caused to enter with the object distance being set to infinity is defined as a secondary spectrum amount Δ, the secondary spectrum amount Δ is expressed by the following expression.

$$\Delta=-(1/\varphi)\cdot(\theta 1-\theta 2)/(\nu 1-\nu 2) \tag{t}$$

In general, the material having the smaller Abbe number νd tends to exhibit the larger partial dispersion ratio θgF, and hence θ1<θ2 is likely to be satisfied. In this case, as understood from the conditional expression (t), the imaging position of the g-line tends to be deviated toward the image plane side on the axis, and to be deviated toward a direction of increasing the image height in off-axis. In order to reduce the secondary spectrum, in the expression (t), the numerator (θ1−θ2) may be decreased, and the denominator (ν1−ν2) may be increased.

In particular, the lateral chromatic aberration, which increases in the lens unit distant from a stop position, is important in the correction of the chromatic aberration with the zoom lens having a wide angle of field. The vibration isolation unit IS of the zoom lens assumed in one embodiment of the present invention has a negative refractive power.

In the zoom lens assumed in one embodiment of the present invention, particularly in regard to a chromatic aberration that occurs in the first lens unit having a positive refractive power, through which an off-axis beam passes along an optical path distant from the optical axis, and that cannot completely be corrected with an adjacent magnification varying system LV, it is effective to correct the chromatic aberration through use of the vibration isolation unit IS. In order to correct the chromatic aberration remaining as illustrated in FIG. 15, such a balance for the correction of the chromatic aberration as to deviate the imaging point of the g-line, which is obtained when the chromatic aberration is corrected with the F-line and the C-line, toward the object side is suitable for the correction of the chromatic aberration to be conducted with a lens unit LN having a negative refractive power as illustrated in FIG. 16. Therefore, as understood from FIG. 16, a combination of a negative lens G1 having a small partial dispersion ratio θ1 and a positive lens G2 having a large partial dispersion ratio θ2 is employed.

For the above-mentioned reasons, in order to achieve high optical performance before and after the correction for the image stabilization while achieving the vibration isolation unit that is smaller in size and more lightweight, such a relationship between the refractive powers of the entire vibration isolation unit IS and the positive lens included in the vibration isolation unit IS as expressed by the conditional expression (1) is necessary. In order to achieve the relationship, the selection of such materials as expressed by the conditional expressions (2) to (5) is necessary.

When the refractive power of the positive lens exceeds the upper limit value of the conditional expression (1) to become too weak, a large number of decentering chromatic aberrations occur from the vibration isolation unit IS during image stabilization, and the correction of those decentering chromatic aberrations is difficult. It is also difficult to correct those decentering chromatic aberrations with another lens unit. Further, when the refractive power of the positive lens falls below the lower limit value of the conditional expression (1) to become too strong, the curvature of the lens surface of the negative lens that forms the vibration isolation unit IS becomes too strong, and it is difficult to conduct the aberration correction before the image stabilization and after the image stabilization.

When the refractive index of the material of the positive lens falls below the lower limit of the conditional expression (2) to become too low, a material having a high dispersion and a high partial dispersion ratio is hard to select from among existing materials, and it is difficult to satisfactorily correct the secondary spectrum of the lateral chromatic aberration at the wide angle end. Further, the lens has a large material thickness, and it is difficult to make the vibration isolation unit smaller in size and more lightweight.

When the refractive index of the material of the negative lens falls below the lower limit of the conditional expression (3) to become too low, the curvature of the lens surface is too strong in order to secure an image blurring sensitivity necessary for the image stabilization, and it is difficult to suppress the decentering aberration from occurring during image stabilization. Further, the lens has a large material thickness, and it is difficult to make the vibration isolation unit smaller in size and more lightweight. When the Abbe number of the material of the positive lens exceeds the upper limit of the conditional expression (4) to become larger, a material having a high dispersion and a high partial dispersion ratio is hard to select from among the existing materials, and it is difficult to satisfactorily correct the secondary spectrum of the lateral chromatic aberration at the wide angle end.

When the Abbe number of the material of the negative lens exceeds the upper limit of the conditional expression (5) to become larger, the curvatures of cemented surfaces or opposed surfaces of the positive lens and the negative lens of the vibration isolation unit IS can no longer be secured appropriately, and hence it is difficult to suppress the decentering aberration from occurring. It is further preferred that the numerical ranges of the conditional expressions (1X) to (5X) be set as follows.

$$0.35<|f51P\times(n51P-1)/f51|<0.75 \quad (1Xa)$$

$$1.83<n51P<2.70 \quad (2Xa)$$

$$1.83<n51N<2.70 \quad (3Xa)$$

$$10.0<\nu 51P<26.0 \quad (4Xa)$$

$$15.0<\nu 51N<29.3 \quad (5Xa)$$

It is further preferred that the numerical ranges of the conditional expressions (1Xa) to (5Xa) be set as follows.

$$0.4<|f51P\times(n51P-1)/f51|<0.7 \quad (1Xaa)$$

$$1.88<n51P<2.70 \quad (2Xaa)$$

$$1.85<n51N<2.70 \quad (3Xaa)$$

$$14.0<\nu 51P<25.0 \quad (4Xaa)$$

$$20.0<\nu 51N<28.5 \quad (5Xaa)$$

Further, it is preferred that the numerical ranges of the conditional expressions (1Y) to (5Y) be set as follows.

$$0.35<|f5P\times(n5P-1)/f5|<0.75 \quad (1Ya)$$

$$1.83<n5P<2.40 \quad (2Ya)$$

$$1.83<n5N<2.40 \quad (3Ya)$$

$$10.0<\nu 5P<26.0 \quad (4Ya)$$

$$15.0<\nu 5N<29.3 \quad (5Ya)$$

It is further preferred that the numerical ranges of the conditional expressions (1a) to (5Ya) be set as follows.

$$0.4<|f5P\times(n5P-1)/f5|<0.7 \quad (1Yaa)$$

$$1.88<n5P<2.40 \quad (2Yaa)$$

$$1.85<n5N<2.40 \quad (3Yaa)$$

$$14.0<\nu 5P<25.0 \quad (4Yaa)$$

$$20.0<\nu 5N<28.5 \quad (5Yaa)$$

In at least one of the conditional expressions (1Xa) to (4Xa), (1Xaa) to (4Xaa), (1Ya) to (4Ya), and (1Yaa) to (4Yaa), it suffices that only the upper limit value or the lower limit value is replaced by the value corresponding to the original conditional expression. When the capability of correcting the chromatic aberration of the vibration isolation unit IS falls below the lower limit of the conditional expression (6) to become insufficient, it is difficult to satisfactorily conduct both the correction of the lateral chromatic aberration and the correction of the decentering chromatic aberration before and after the image stabilization.

It is further preferred that the numerical range of the conditional expression (6X) be set as follows.

$$4.0\times 10^{-3}<(\theta 51P-\theta 51N)/(\nu 51N-\nu 51P)<9.0\times 10^{-3} \quad (6Xa)$$

It is further preferred that the numerical range of the conditional expression (6Xa) be set as follows.

$$5.0\times 10^{-3}<(\theta 51P-\theta 51N)/(\nu 51N-\nu 51P)<7.0\times 10^{-3} \quad (6Xaa)$$

It is preferred that the numerical range of the conditional expression (6Y) be set as follows.

$$4.0\times 10^{-3}<(\theta 5P-\theta 5N)/(\nu 5N-\nu 5P)<9.0\times 10^{-3} \quad (6Ya)$$

It is further preferred that the numerical range of the conditional expression (6Ya) be set as follows.

$$5.0\times 10^{-3}<(\theta 5P-\theta 5N)/(\nu 5N-\nu 5P)<7.0\times 10^{-3} \quad (6Yaa)$$

In the zoom lens according to one embodiment of the present invention, on the image side of the aperture stop SP, the lens unit having a positive refractive power and configured to move for zooming is arranged as a movable lens unit. During zooming from the wide angle end to the telephoto end, the movable lens unit is moved from the image side to the object side, to thereby gain the zoom ratio. Thus, a high zoom ratio is obtained even when an entire system of a zoom lens is small in size and lightweight.

In each of Examples, a second lens unit U2 and a fourth lens unit U4 are the movable lens units, and are configured to gather near the aperture stop SP at the telephoto end. An axial beam diameter becomes larger in a position closer to the aperture stop SP, and hence variations in an axial chromatic aberration are corrected with a second lens unit L2 and a fourth lens unit L4 over a range from the wide angle end to the telephoto end. The fourth lens unit U4 is formed as a cemented lens having a positive refractive power by employing a material having a low dispersion for the positive lens and a material having a high dispersion for the negative lens based on the expression (t).

By employing such a structure, a higher zoom ratio and high optical performance are obtained. Further, the positions on the optical axis of the third lens unit U3 and the fourth lens unit U4 arranged on the image plane side of the aperture stop SP are greatly changed from the image side to the object side between the wide angle end and the telephoto end. Therefore, the vibration isolation unit IS is configured as described above, to thereby satisfactorily correct the chromatic aberration.

When a movement amount of the fourth lens unit U4 falls below or exceeds the lower limit or the upper limit of the conditional expression (7) to become too small or too large, a deviation in length occurs in a drive stroke of the magnification varying system LV before and after the aperture stop SP, and it is difficult to optimize lens diameters of the lens units, a weight balance, and the like.

It is further preferred that the numerical range of the conditional expression (7X) be set as follows.

$$0.05<D4wX/D4tX<0.35 \quad (7Xa)$$

It is further preferred that the numerical range of the conditional expression (7Xa) be set as follows.

$$0.06<D4wX/D4tX<0.30 \quad (7Xaa)$$

Further, it is preferred that the numerical range of the conditional expression (7Y) be set as follows.

$$0.05<D4wY/D4tY<0.35 \quad (7Ya)$$

It is further preferred that the numerical range of the conditional expression (7Ya) be set as follows.

$$0.06<D4wY/D4tY<0.30 \quad (7Yaa)$$

In the zoom lens according to one embodiment of the present invention, it is desired that the vibration isolation unit IS consists of one positive lens and one negative lens. Alternatively, it is preferred that the vibration isolation unit IS consists of one positive lens and two negative lenses.

In order to satisfactorily suppress such decentering aberrations due to image stabilization drive as expressed by the expressions (c) to (l) described later from occurring, it is preferred that the vibration isolation unit IS include a cemented lens obtained by cementing a positive lens and a negative lens. The vibration isolation unit that makes the entire system of the zoom lens small in size and lightweight is easily obtained while appropriately controlling the decentering aberration sensitivity due to the cemented lens. The vibration isolation unit IS may not necessarily include a cemented lens, and may be formed by incorporating a positive lens and a negative lens into a lens barrel. The inclusion of the cemented lens is advantageous in reduction of an aberration sensitivity, simplification of a mechanism, and the like. Further, a long back focus can be secured with the above-mentioned configuration of the rear lens unit LR.

In a television camera, a photographic camera, and the like, an optical system, e.g., an optical filter or a color separation system prism, is easily inserted between the zoom lens and an image pickup plane. Further, the subunit (lens unit) having a positive refractive power is provided on the image side of the vibration isolation unit IS, to thereby facilitate appropriate setting of an axial deviation sensitivity for the image stabilization.

Next, the decentering aberration that occurs when the subunit within the optical system is decentered in the direction perpendicular to the optical axis in the zoom lens according to one embodiment of the present invention is described, from a standpoint of an aberration theory, based on a method proposed by Matsui in "The 23rd meeting of the Japan Society of Applied Physics (1962)".

An aberration amount $\Delta'Y$ of the entire system of the zoom lens obtained when a partial lens unit (decentered lens unit) p of a photographing lens is parallelly decentered by E is a sum of an aberration amount $\Delta Y$ before decentering and a decentering aberration amount $\Delta Y(E)$ that occurs due to the decentering as expressed by the expression (a). Here, the decentering aberration $\Delta Y(E)$ is expressed as in the expression (b) through use of a primary decentering coma (IIE), a primary decentering astigmatism (IIIE), a primary decentering field curvature (PE), a primary decentering distortion (VE1), a primary decentering distortion added aberration (VE2), and a primary origin shift $\Delta E$.

In this case, when a focal length of the entire system of the zoom lens is normalized as 1, an angle of incidence and an outgoing angle of an axial marginal ray of a paraxial beam with respect to the decentered lens unit are represented by $\alpha p$ and $\alpha p'$, respectively, and an angle of incidence of a principal ray passing through the center of pupil is represented by $\overline{\alpha}_p$.

Then, the aberrations from (IIE) to ($\Delta E$) of the expressions (c) to (h) are expressed through use of the aberration coefficients Ip, IIp, III$_A$, Pp, and Vp of the decentered lens unit and the aberration coefficients Iq, IIq, IIIq, Pq, and Vq of the lens system on the image side of the decentered lens unit. In the same manner, a chromatic aberration amount $\Delta cYa$ of the entire system of the zoom lens obtained when a lens unit p is parallelly decentered by E is a sum of an aberration amount $\Delta cY$ before the parallel decentering and an aberration amount $\Delta cY(E)$ that occurs due to the decentering as expressed by the expression (i).

In this case, the aberration amount $\Delta cY$ before the parallel decentering and the decentering aberration amount $\Delta cY(E)$ can be expressed as the expression (j) and the expression (k), respectively, through use of an axial chromatic aberration L, a lateral chromatic aberration T, and a primary decentering chromatic aberration Te. Further, a primary decentering chromatic aberration coefficient (TE) of the expression (l) can be expressed through use of chromatic aberration coefficients Lp and Tp of the lens unit p and chromatic aberration coefficients Lq and Tq of the entire lens unit arranged on the image plane side of the lens unit to be parallelly decentered.

$$\Delta'Y = \Delta Y + \Delta Y(E) \tag{a}$$

$$\Delta Y(E) = \tag{b}$$

$$-\frac{E}{2\alpha'_k}\begin{bmatrix} R^2(2+\cos 2\phi_R)(IIE) + 2R(N_1\tan\omega) \\ \begin{bmatrix} \{2\cos(\phi_R - \phi_\omega) + \cos(\phi_R + \phi_\omega)\}(IIIE) + \\ \cos\phi_R\phi_\omega(PE) \end{bmatrix} \\ (N_1\tan\omega)^2\{(2+2\cos\phi_\omega)(VE1) - (VE2)\} \end{bmatrix} + \left[-\frac{1}{2\alpha'_k}\{E(\Delta E)\}\right]$$

$$(IIE) = \alpha'_p II_q - \alpha_p(II_p + II_q) - \overline{\alpha}'_p I_q + \overline{\alpha}_p(I_p + I_q) \tag{c}$$

$$(IIIE) = \alpha'_p III_q - \alpha_p(III_p + III_q) - \overline{\alpha}'_p II_q + \overline{\alpha}_p(II_p + II_q) \tag{d}$$

$$(PE) = \alpha'_p P_q - \alpha_p(P_p + P_q) \tag{e}$$

$$(VE1) = \alpha'_p V_q - \alpha_p(V_p + V_q) - \overline{\alpha}'_p III_q + \overline{\alpha}_p(III_p + III_q) \tag{f}$$

$$(VE2) = \overline{\alpha}'_p P_q - \overline{\alpha}_p(P_p + P_q) \tag{g}$$

$$(\Delta E) = -2(\alpha'_p - \alpha_p) \tag{h}$$

$$\Delta cYa = \Delta cY + \Delta cY(E) \tag{i}$$

$$\Delta cY = -\frac{1}{\alpha'_k}\{LR\cos\phi_R + TN\tan\omega\cos\phi_\omega\} \tag{j}$$

$$\Delta cY(E) = -\frac{E}{\alpha'_k}(TE) \tag{k}$$

$$(TE) = \alpha'_p T_q - \alpha_p(T_p + T_q) - \overline{\alpha}'_p L_q + \overline{\alpha}_p(L_p + L_q) \tag{l}$$

Of those, the primary origin shift ($\Delta E$) represents displacement of an image due to decentering, and (IIE), (IIIE), (PE), and (TE) affect imaging performance. In order to reduce the occurrence of the decentering aberration, it is first necessary to reduce a decentering amount E of the lens unit p as expressed by the expression (b).

Secondly, in order to make the decentering aberration coefficients of the lens unit p expressed by the expressions (c) to (g) minute, the respective aberration coefficients Ip, IIp, IIIp, Pp, and Vp of the lens unit p need to be set to small values, or to be set in a well-balanced manner so that the respective aberration coefficients cancel each other. In particular, each of paraxial amounts and aberration coefficients relating to the lens unit p to be parallelly decentered and a lens unit q on the image plane side of the lens unit p needs to be set appropriately so that the decentering aberration coefficients expressed above by the expressions (c) to (g) become small values.

That is, in order to suppress deterioration in image quality of a central image to be caused by the image stabilization (image blur correction), it is mainly necessary to satisfactorily correct the primary decentering coma expressed by the expression (c). At the same time, in order to satisfactorily correct deterioration in image quality of a peripheral image to be caused by the image stabilization, it is mainly necessary to satisfactorily correct the primary decentering field curvature expressed by the expression (d). It should be understood that other respective aberrations also need to be satisfactorily corrected.

Thirdly, in order to make the decentering chromatic aberration coefficient (TE) expressed by the expression (l) minute, the respective chromatic aberration coefficients of the lens unit p and the entire lens unit q arranged on the image plane side of the lens unit p need to be set appropriately. The zoom lens having an image stabilizing function (image blur correction function) according to one embodiment of the present invention is configured in consideration of the first to third items described above.

Next, a description is made of a change in focus that occurs when a subsystem within the optical system is deviated in a direction along the optical axis. A focus movement amount $\Delta SK(\sigma)$ obtained when the lens unit p being a part of the photographing lens is deviated by a predetermined amount $\delta$ in the optical axis direction is expressed by:

$$\Delta SK(\delta) = (1 - \beta_p^2) \beta_q \qquad (m)$$

where $\beta p$ represents a lateral magnification of the lens unit p, and $\beta q$ represents a lateral magnification of the lens unit q. In short, $\Delta SK(\sigma)$ becomes smaller as the absolute value of the lateral magnification $\beta p$ of the lens unit p becomes closer to 1, and the change in focus accompanying the deviation of the lens unit p in the optical axis direction can be reduced. Here, the lateral magnification $\beta p$ of the lens unit p is expressed by the following expression through use of an incidence converted inclination angle from the lens unit on the object side of the lens unit p, a beam incident height hp, and the refractive power $\varphi p$ of the lens unit p.

$$\beta_p = \alpha_p / \alpha_p' = \alpha_p / (\alpha_p + h_p \phi_p) \qquad (n)$$

Therefore, in order to appropriately control the movement amount $\Delta SK(\sigma)$, power arrangement of the lens unit on the object side of the vibration isolation unit needs to be controlled depending on the refractive power of a subunit for image blur correction (vibration isolation unit). The zoom lens having the image stabilizing function according to one embodiment of the present invention is also configured in consideration of the above-mentioned points. It is understood from the expression (m) that the lateral magnification of the lens unit q also contributes to $\Delta SK(\sigma)$. An incidence converted inclination angle $\alpha q$ with respect to the lens unit q is equal to $\alpha p'$, and in the zoom lens according to one embodiment of the present invention, the lens unit q is a lens unit arranged closest to the image side.

Therefore, when the lateral magnification $\beta p$ is determined, the lateral magnification $\beta q$ is simultaneously determined as well, and hence it is important to control an incidence converted inclination angle $\alpha p$ with respect to the vibration isolation unit. Further, in order to obtain a decentering amount EIS of the vibration isolation unit necessary to obtain a predetermined image blur correction amount $\Delta Y$ on the image plane is expressed by the following expression based on the expression (b) with R=0, $\omega$=0, and $\alpha k'$=1.

$$EIS = -\Delta Y / \{2(\Delta E)\} \qquad (o)$$

The primary origin shift ($\Delta E$) is expressed by the expression (h), and hence the decentering amount EIS necessary to obtain the necessary image blur correction amount $\Delta Y$ is defined by the incidence converted inclination angle $\alpha p$ and an outgoing converted inclination angle $\alpha' p$ of the axial marginal ray with respect to the vibration isolation unit. The term "sensitivity" referred to in this specification represents $\Delta(\sigma)/\sigma$ in a case where an element of interest varies by $\Delta(\sigma)$ when a lens thickness, a curvature radius, a decentering amount of the lens, or the like is varied by a minute amount $\delta$.

Next, a lens configuration of the zoom lens in each of Examples is described. In the lens cross-sectional view of Example 1 of FIG. 1A to FIG. 1C, U1 represents the first lens unit having a positive refractive power, which is configured not to move during zooming. The first lens unit U1 is configured to perform focusing by moving a part or an entirety of the first lens unit U1. U2 represents the second lens unit having a negative refractive power, which is configured to move from the object side to the image side on the optical axis during zooming from the wide angle end to the telephoto end. U3 represents the third lens unit having a positive refractive power, which is configured to move on the optical axis during zooming. U4 represents the fourth lens unit having a positive refractive power, which is configured to move from the image side to the object side during zooming from the wide angle end to the telephoto end.

The magnification varying system LV includes the second lens unit U2, the third lens unit U3, and the fourth lens unit U4. SP represents a stop (aperture stop) arranged within the magnification varying system LV. LR represents a rear lens unit including the fifth lens unit U5 having a negative refractive power. The fifth lens unit U5 is configured not to move during zooming. The fifth lens unit U5 includes the front fifth subunit having a negative refractive power and the rear fifth subunit having a positive refractive power, which are arranged in order from the object side to the image side. IS represents the vibration isolation unit for image blur correction, and corresponds to the front fifth subunit U51 in Example 1. An interval between the front fifth subunit and the rear fifth subunit is fixed during zooming.

In Example 1, the front fifth subunit U51 includes a cemented lens obtained by cementing one positive lens (G51P) and one negative lens (G51N). A rear fifth subunit U52 includes one positive lens and a cemented lens obtained by cementing one positive lens and one negative lens, which are arranged in order from the object side to the image side. In Example 1, values of the conditional expressions (1X) to (7X) are shown in Table 1.

In Table 2, paraxial tracing values and the respective aberration coefficients relating to the front fifth subunit U51 and the rear fifth subunit U52 and the decentering aberration coefficient of the front fifth subunit U51 are shown. It is understood from Table 2 that the decentering aberration coefficient of the front fifth subunit U51 is satisfactorily suppressed by controlling the paraxial amounts and the aberration coefficients of the front fifth subunit U51 and the rear fifth subunit U52. In this manner, in the present invention, the paraxial amount of the vibration isolation unit and sharing values of the respective aberration coefficients between the vibration isolation unit and the lens unit on the image side of the vibration isolation unit are set appropriately, to thereby make the respective decentering aberration coefficients of the vibration isolation unit minute.

As described above, in this Example, refractive power arrangement of the entire system of the zoom lens, arrangement of the moving lens units during zooming, and arrangement of the vibration isolation unit within the fifth lens unit are set appropriately, to thereby obtain high optical performance over the entire zoom range even during the image stabilization. An effective diameter of the vibration isolation unit (front fifth subunit U51) of Example 1 is set to have a value obtained by adding a shift amount of the vibration isolation unit to the effective diameter to be exhibited when the image stabilization is not conducted.

The incidence converted inclination angle and an outgoing converted inclination angle with respect to the vibration isolation unit of Example 1 are $\alpha IS$=0.053 and $\alpha IS'$=0.020, respectively, and hence an image can be displaced by 0.69 mm by decentering the vibration isolation unit by 1 mm in the direction perpendicular to the optical axis. Thus, the decentering amount of the vibration isolation unit to be exhibited when the optical axis is moved by 1 mm by the image stabilization is calculated as 1.45 mm. Therefore, the effective diameter of Example 1 is determined as a value obtained by adding 2.9 mm to an original effective diameter. In the following Examples, the effective diameter of the vibration isolation unit is also determined based on the same concept.

In the lens cross-sectional view of Example 2 of FIG. 4A to FIG. 4C, U1 represents the first lens unit having a positive refractive power, which is configured not to move during zooming. The first lens unit U1 is configured to perform focusing by moving a part or the entirety of the first lens unit U1. U2 represents the second lens unit having a negative refractive power, which is configured to move to the image plane side on the optical axis during zooming from the wide angle end to the telephoto end. U3 represents the third lens unit having a positive refractive power, which is configured not to move during zooming. U4 represents the fourth lens unit having a positive refractive power, which is configured to move from the image side to the object side during zooming from the wide angle end to the telephoto end. The magnification varying system LV includes the second lens unit U2 and the fourth lens unit U4.

SP represents a stop (aperture stop) arranged within the magnification varying system LV. LR represents the rear lens unit including the fifth lens unit having a positive refractive power. The fifth lens unit U5 is configured not to move during zooming. IS represents the vibration isolation unit for image blur correction, and corresponds to the front fifth subunit in Example 2. The front fifth subunit U51 functions to move so as to have a component in the direction perpendicular to the optical axis and to move the imaging position toward the direction perpendicular to the optical axis.

In Example 2, the front fifth subunit U51 being the vibration isolation unit includes a cemented lens obtained by cementing one negative lens (G51N) and one positive lens (G51P), which are arranged in order from the object side to the image side. The rear fifth subunit U52 includes one positive lens and a cemented lens obtained by cementing one positive lens and one negative lens, which are arranged in order from the object side to the image side.

In Example 2, values of the respective conditional expressions are the values shown in Table 1, and it is understood that the conditional expressions (1X) to (6X) are satisfied. Further, in Table 2, the decentering aberration coefficient of the front fifth subunit U51 being the vibration isolation unit of Example 2 is shown, and it is understood that the decentering aberration is satisfactorily suppressed. In the zoom lens of Example 2, the decentering amount of the vibration isolation unit to be exhibited when the optical axis is moved by 1 mm by the image stabilization is 1.43 mm, and the effective diameter of the vibration isolation unit is determined as the value obtained by adding 2.86 mm to the original effective diameter.

In the zoom lens of Example 3 of FIG. 7A to FIG. 7C, the number of lens units, the signs of the refractive powers of the lens units, movement conditions of the lens units during zooming, the lens configuration of the fifth lens unit U5, the position of the aperture stop SP for the image blur correction, the focusing, and the like are the same as those of Example 1.

In Example 3, the front fifth subunit U51 being the vibration isolation unit includes one negative lens (G51N) and a cemented lens obtained by cementing one negative lens and one positive lens (G51P), which are arranged in order from the object side to the image side. The rear fifth subunit U52 includes one positive lens and a cemented lens obtained by cementing one positive lens and one negative lens, which are arranged in order from the object side to the image side.

In Example 3, values of the respective conditional expressions are the values shown in Table 1, and it is understood that the conditional expressions (1X) to (7X) are satisfied. Further, in Table 2, the decentering aberration coefficient of the front fifth subunit U51 being the vibration isolation unit of Example 3 is shown, and it is understood that the decentering aberration is satisfactorily suppressed. In the zoom lens of Example 3, the decentering amount of the vibration isolation unit to be exhibited when the optical axis is moved by 1 mm by the image stabilization is 1.27 mm, and the effective diameter of the vibration isolation unit is determined as the value obtained by adding 2.54 mm to the original effective diameter.

In the lens cross-sectional view of Example 4 of FIG. 10A to FIG. 10C, U1 represents the first lens unit having a positive refractive power, which is configured not to move during zooming. U2 represents the second lens unit having a negative refractive power, which is configured to move to the image plane side on the optical axis during zooming from the wide angle end to the telephoto end. U3 represents the third lens unit having a positive refractive power, which is configured not to move during zooming. U4 represents the fourth lens unit having a positive refractive power, which is configured to move from the image side to the object side on the optical axis during zooming from the wide angle end to the telephoto end.

LR represents a rear lens unit including the fifth lens unit U5 having a negative refractive power and a sixth lens unit U6 having a positive refractive power, which are arranged in order from the object side to the image side. The fifth lens unit U5 is configured not to move during zooming. The sixth lens unit U6 is configured to move during zooming. The magnification varying system LV includes the second lens unit U2, the fourth lens unit U4, and the sixth lens unit U6. SP represents a stop (aperture stop) arranged within the magnification varying system LV. IS represents the vibration isolation unit for image blur correction, and corresponds to the fifth lens unit U5 in Example 4. The fifth lens unit U5 functions to move so as to have a component in the direction perpendicular to the optical axis and to move the imaging position toward the direction perpendicular to the optical axis.

In Example 4, the fifth lens unit U5 being the vibration isolation unit includes a cemented lens obtained by cementing one positive lens (G5P) and one negative lens (G5N), which are arranged in order from the object side to the image side. The sixth lens unit U6 includes one positive lens and a cemented lens obtained by cementing one positive lens and one negative lens, which are arranged in order from the object side to the image side.

In Example 4, values of the respective conditional expressions are the values shown in Table 1, and it is understood that the conditional expressions (1Y) to (7Y) are satisfied. Further, in Table 2, the decentering aberration coefficient of the fifth lens unit U5 being the vibration isolation unit of Example 4 is shown, and it is understood that the decentering aberration is satisfactorily suppressed. In the zoom lens of Example 4, the decentering amount of the vibration isolation unit to be exhibited when the optical axis is moved by 1 mm by the image stabilization is 1.82 mm, and the effective diameter of the vibration isolation unit is determined as the value obtained by adding 3.64 mm to the original effective diameter.

The exemplary embodiments of the present invention are described above, but the present invention is not limited to those embodiments and can be modified and changed variously within the scope of the gist thereof.

FIG. 13 is a schematic diagram of an image pickup apparatus that employs the zoom lens of Examples 1 to 4 as an image pickup optical system. In FIG. 13, a zoom lens 101 according to any one of Examples 1 to 4 and a camera 201 are illustrated. The zoom lens 101 is attachably and detachably provided to the camera 201. An image pickup apparatus 301 is configured by mounting the zoom lens 101 to the camera 201. The zoom lens 101 includes the first lens unit U1, the magnification varying system LV, a relay lens unit LR.

The first lens unit U1 includes a lens unit for focusing. The magnification varying system LV includes a variator unit configured to move on the optical axis in order to vary magnification and a compensator unit configured to move on the optical axis in order to correct the image plane variation accompanying the magnification varying. The relay lens unit LR can also include a lens unit (extender) configured to displace the focal length of the entire system of the zoom lens, which can be inserted into and extracted from the optical path.

Also in FIG. 13, an aperture stop SP is illustrated. Driving mechanisms 102 to 104 are configured to drive the lens units included in the first lens unit U1, the magnification varying system LV, and the relay lens unit LR, respectively, in the optical axis direction, and examples thereof include a helicoid and a cam. Motors (drive units) 105 to 108 are configured to electrically drive the driving mechanisms 102 and 103, the aperture stop SP, and the driving mechanism 104, respectively.

Detectors 109 to 112 are configured to detect positions on the optical axis of the lens units included in the first lens unit U1 and the magnification varying system LV, a stop diameter of the aperture stop SP, and a position on the optical axis of the lens unit included in the relay lens unit LR, respectively, and examples thereof include an encoder, a potentiometer, and a photosensor. In the camera 201, a glass block 202 corresponds to an optical filter or a color separation optical system, and a solid-state image pickup element 203 (photoelectric conversion element), e.g., a CCD sensor or a CMOS sensor receives light of a subject image formed by the zoom lens 101. In addition, CPUs 204 and 113 are configured to control various drives of the camera 201 and the zoom lens 101.

Next, Numerical Data 1 to Numerical Data 4 corresponding to Examples 1 to 4 of the present invention are described. In Numerical Data, symbol i represents a place in an order of surfaces from the object side. Symbol ri represents a curvature radius of the i-th surface in the order from the object side, symbol di represents a lens thickness and an air gap between the i-th and the (i+1)th in the order from the object side, and symbols ndi and vdi represent a refractive index and an Abbe number, respectively, of a material of the i-th optical member in the order from the object side. An aspherical shape is expressed by the following expression:

$$X = \frac{H^2/R}{1+\sqrt{1-(1+K)(H/R)^2}} + A4H^4 + A6H^6 + A8H^8$$

where X represents a coordinate in the optical axis direction, H represents a coordinate in the direction perpendicular to the optical axis, a traveling direction of light corresponds to a positive direction, R represents a paraxial curvature radius, K represents a conic constant, and A4, A6, and A8 each represent an aspherical coefficient. "*" means a surface having the aspherical shape. "e-x" means $10^{-x}$. BF represents a back focus, which is expressed by an air-converted length from a final lens surface to the image plane. A total lens length is a value obtained by adding the back focus BF to a distance from the first lens surface to the final lens surface. Calculation results of the respective conditional expressions based on lens data of the respective pieces of Numerical Data are shown in Table 1. In Table 2, the values of the angle of incidence and the aberration coefficient relating to the decentering aberration are shown.

[Numerical Data 1]

| Unit mm | | | | | |
|---|---|---|---|---|---|
| Surface data | | | | | |
| Surface number i | ri | di | ndi | vdi | Effective diameter |
| 1* | 167.417 | 2.70 | 1.77250 | 49.6 | 53.29 |
| 2 | 30.689 | 14.67 | | | 43.52 |
| 3 | −58.109 | 1.98 | 1.77250 | 49.6 | 42.74 |
| 4 | 436.721 | 1.94 | | | 43.30 |
| 5 | 78.838 | 3.05 | 1.89286 | 20.4 | 44.36 |
| 6 | 128.463 | 2.03 | | | 44.08 |
| 7 | 122.116 | 7.74 | 1.62041 | 60.3 | 44.10 |
| 8 | −68.602 | 0.20 | | | 43.82 |
| 9 | 100.918 | 1.89 | 1.85478 | 24.8 | 39.70 |
| 10 | 38.446 | 6.48 | 1.49700 | 81.5 | 38.30 |
| 11 | 686.721 | 3.07 | | | 38.64 |
| 12 | 100.119 | 5.04 | 1.59522 | 67.7 | 40.28 |
| 13 | −140.904 | 0.18 | | | 40.36 |
| 14 | 58.236 | 4.23 | 1.76385 | 48.5 | 39.90 |
| 15 | 281.093 | (Variable) | | | 39.39 |
| 16* | 130.558 | 1.26 | 1.88300 | 40.8 | 24.42 |
| 17 | 26.342 | 3.54 | | | 22.35 |
| 18 | −147.816 | 1.08 | 1.59522 | 67.7 | 22.43 |
| 19 | 27.615 | 3.94 | 1.85478 | 24.8 | 23.00 |
| 20 | −4,109.683 | 3.05 | | | 22.98 |
| 21 | −39.620 | 1.08 | 1.76385 | 48.5 | 22.94 |
| 22 | 15,916.473 | (Variable) | | | 23.63 |
| 23 (Stop) | ∞ | (Variable) | | | 24.54 |
| 24 | 45.339 | 4.69 | 1.59522 | 67.7 | 25.92 |
| 25* | 407.328 | (Variable) | | | 26.04 |
| 26 | −3,119.321 | 4.16 | 1.49700 | 81.5 | 26.29 |
| 27 | −44.183 | 0.18 | | | 26.51 |
| 28 | 32.200 | 1.49 | 2.00100 | 29.1 | 25.74 |
| 29 | 24.075 | 3.91 | 1.49700 | 81.5 | 24.63 |
| 30 | 69.541 | (Variable) | | | 24.20 |
| 31 | 193.866 | 3.18 | 1.95906 | 17.5 | 24.58 |
| 32 | −54.994 | 1.49 | 2.00069 | 25.5 | 24.53 |
| 33 | 61.319 | 3.83 | | | 24.43 |
| 34 | 136.970 | 5.02 | 1.48749 | 70.2 | 25.63 |
| 35 | −47.845 | 0.18 | | | 26.11 |
| 36 | 39.702 | 8.19 | 1.49700 | 81.5 | 26.12 |
| 37 | −34.863 | 1.68 | 1.95375 | 32.3 | 25.29 |
| 38 | 215.576 | 40.94 | | | 25.36 |
| Image plane | ∞ | | | | |

| Aspherical surface data | | |
|---|---|---|
| First surface | | |
| K = 2.07301e+001 | A4 = 5.35620e−007 | A6 = 5.62395e−012 |
| A8 = −6.76339e−013 | | |
| Sixteenth surface | | |
| K = 0.00000e+000 | A4 = −4.51816e−007 | A6 = −2.39976e−009 |
| A8 = 9.88154e−014 | | |

-continued

Unit mm

Twenty-fifth surface

K = 0.00000e+000   A4 = 5.01207e−006   A6 = −1.08926e−009
A8 = 4.32060e−012

Various data
Zoom ratio 4.74

|  | Wide angle | Intermediate | Telephoto |
|---|---|---|---|
| Focal length | 19.00 | 40.00 | 90.00 |
| F-number | 4.00 | 4.00 | 4.00 |
| Half angle of field (degrees) | 39.30 | 21.24 | 9.80 |
| Total lens length | 220.09 | 220.10 | 220.09 |
| BF | 40.94 | 40.93 | 40.94 |
| d15 | 0.95 | 20.15 | 29.61 |
| d22 | 30.73 | 11.55 | 2.08 |
| d23 | 8.40 | 11.05 | 1.23 |
| d25 | 24.63 | 12.82 | 2.01 |
| d30 | 7.29 | 16.44 | 37.07 |
| Entrance pupil position | 32.11 | 44.78 | 51.89 |
| Exit pupil position | −94.45 | −75.33 | −57.16 |
| Front principal point position | 48.44 | 71.02 | 59.33 |
| Rear principal point position | 21.94 | 0.93 | −49.06 |

Zoom lens unit data

| Unit | First surface | Focal length | Lens structure length | Front principal point position | Rear principal point position |
|---|---|---|---|---|---|
| 1 | 1 | 45.00 | 55.19 | 41.56 | 31.17 |
| 2 | 16 | −22.80 | 13.95 | 4.26 | −5.54 |
| 3 | 24 | 85.00 | 4.69 | −0.37 | −3.29 |
| 4 | 26 | 65.00 | 9.74 | 0.24 | −5.86 |
| 5 | 31 | −83.63 | 4.67 | 3.34 | 0.94 |
| 6 | 34 | 89.57 | 15.07 | −6.90 | −15.19 |

Single lens data

| Lens | First surface | Focal length |
|---|---|---|
| 1 | 1 | −48.83 |
| 2 | 3 | −65.96 |
| 3 | 5 | 219.58 |
| 4 | 7 | 71.64 |
| 5 | 9 | −73.00 |
| 6 | 10 | 81.43 |
| 7 | 12 | 98.76 |
| 8 | 14 | 94.91 |
| 9 | 16 | −37.37 |
| 10 | 18 | −38.86 |
| 11 | 19 | 31.80 |
| 12 | 21 | −51.49 |
| 13 | 24 | 85.00 |
| 14 | 26 | 89.87 |
| 15 | 28 | −104.14 |
| 16 | 29 | 71.82 |
| 17 | 31 | 44.36 |
| 18 | 32 | −28.52 |
| 19 | 34 | 73.14 |
| 20 | 36 | 38.65 |
| 21 | 37 | −31.13 |

[Numerical Data 2]

Unit mm

Surface data

| Surface Number i | ri | di | ndi | vdi | Effective diameter |
|---|---|---|---|---|---|
| 1* | 60.404 | 2.35 | 1.77250 | 49.6 | 67.74 |
| 2 | 26.743 | 15.99 |  |  | 50.93 |
| 3 | 82.959 | 1.90 | 1.69680 | 55.5 | 49.45 |
| 4 | 29.961 | 10.06 |  |  | 42.63 |
| 5 | 7,811.430 | 1.90 | 1.69680 | 55.5 | 42.18 |
| 6 | 53.459 | 3.60 |  |  | 40.84 |
| 7 | 50.362 | 6.94 | 1.85478 | 24.8 | 41.63 |
| 8 | 499.097 | 1.20 |  |  | 40.78 |
| 9 | 150.134 | 4.26 | 1.58913 | 61.1 | 40.06 |
| 10 | −285.305 | 9.32 |  |  | 39.48 |
| 11 | 106.523 | 1.50 | 1.85478 | 24.8 | 35.11 |
| 12 | 29.885 | 7.06 | 1.49700 | 81.5 | 33.33 |
| 13 | −182.112 | 0.20 |  |  | 33.18 |
| 14 | 60.724 | 5.61 | 1.72916 | 54.7 | 32.35 |
| 15 | −69.016 | (Variable) |  |  | 31.76 |
| 16 | −84.618 | 1.00 | 1.88300 | 40.8 | 20.42 |
| 17 | 28.673 | 3.73 |  |  | 18.56 |
| 18 | −53.224 | 1.00 | 1.49700 | 81.5 | 18.98 |
| 19 | 28.683 | 4.36 | 1.85478 | 24.8 | 20.44 |
| 20 | 216.782 | (Variable) |  |  | 20.85 |
| 21 (Stop) | ∞ | 4.41 |  |  | 22.04 |
| 22 | 33.475 | 6.26 | 1.58313 | 59.4 | 24.58 |
| 23* | −385.853 | 1.50 |  |  | 24.32 |
| 24 | −45.833 | 2.25 | 1.58913 | 61.1 | 24.33 |
| 25 | −45.724 | (Variable) |  |  | 24.67 |
| 26 | 43.821 | 1.15 | 2.00100 | 29.1 | 24.13 |
| 27 | 24.993 | 6.04 | 1.48749 | 70.2 | 23.36 |
| 28 | −51.553 | (Variable) |  |  | 23.21 |
| 29 | 235.222 | 1.15 | 1.85478 | 24.8 | 24.35 |
| 30 | 22.200 | 3.60 | 1.95906 | 17.5 | 24.51 |
| 31 | 41.210 | 4.42 |  |  | 24.47 |
| 32 | 84.793 | 3.08 | 1.43875 | 94.9 | 23.60 |
| 33 | −370.419 | 0.20 |  |  | 24.15 |
| 34 | 73.094 | 7.43 | 1.43875 | 94.9 | 24.66 |
| 35 | −25.133 | 1.30 | 1.95375 | 32.3 | 25.07 |
| 36 | −40.000 | 40.61 |  |  | 26.04 |
| Image plane | ∞ |  |  |  |  |

Aspherical surface data

First surface

K = 1.42741e+000   A4 = 1.02013e−006   A6 = −1.81890e−010
A8 = 1.43872e−013

Twenty-third surface

K = 0.00000e+000   A4 = 7.57264e−006   A6 = −2.03383e−009
A8 = 8.59041e−012

Various data
Zoom ratio 2.50

|  | Wide angle | Intermediate | Telephoto |
|---|---|---|---|
| Focal length | 14.00 | 21.00 | 35.00 |
| F-number | 2.80 | 2.80 | 2.80 |
| Half angle of field (degrees) | 47.97 | 36.52 | 23.95 |
| Total lens length | 206.06 | 206.06 | 206.06 |
| BF | 40.61 | 40.61 | 40.61 |
| d15 | 0.98 | 11.28 | 23.32 |
| d20 | 25.57 | 15.26 | 3.22 |
| d25 | 11.32 | 5.71 | 3.38 |
| d28 | 2.83 | 8.44 | 10.76 |
| Entrance pupil position | 32.04 | 35.19 | 39.44 |

-continued

Unit mm

|  | | | |
|---|---|---|---|
| Exit pupil position | −79.69 | −71.35 | −68.81 |
| Front principal point position | 44.42 | 52.25 | 63.24 |
| Rear principal point position | 26.59 | 19.61 | 5.61 |

Zoom lens unit data

| Unit | First surface | Focal length | Lens structure length | Front principal point position | Rear principal point position |
|---|---|---|---|---|---|
| 1 | 1 | 30.57 | 71.89 | 44.99 | 37.60 |
| 2 | 16 | −23.57 | 10.08 | 0.52 | −6.67 |
| 3 | 22 | 53.20 | 14.42 | 5.77 | −5.73 |
| 4 | 26 | 85.00 | 7.19 | 2.76 | −1.98 |
| 5 | 29 | 408.99 | 21.19 | 48.09 | 37.26 |

Single lens data

| Lens | First surface | Focal length |
|---|---|---|
| 1 | 1 | −63.77 |
| 2 | 3 | −68.02 |
| 3 | 5 | −76.93 |
| 4 | 7 | 64.45 |
| 5 | 9 | 166.93 |
| 6 | 11 | −48.58 |
| 7 | 12 | 52.08 |
| 8 | 14 | 44.93 |
| 9 | 16 | −24.01 |
| 10 | 18 | −37.24 |
| 11 | 19 | 37.90 |
| 12 | 22 | 52.90 |
| 13 | 24 | 3,748.95 |
| 14 | 26 | −59.47 |
| 15 | 27 | 35.33 |
| 16 | 29 | −28.48 |
| 17 | 30 | 45.29 |
| 18 | 32 | 157.19 |
| 19 | 34 | 43.53 |
| 20 | 35 | −73.53 |

[Numerical Data 3]

Unit mm

Surface data

| Surface Number i | ri | di | ndi | vdi | Effective diameter |
|---|---|---|---|---|---|
| 1 | 320.688 | 3.20 | 1.77250 | 49.6 | 59.15 |
| 2 | 47.058 | 15.77 | | | 51.24 |
| 3 | −86.194 | 2.70 | 1.77250 | 49.6 | 48.83 |
| 4 | 217.037 | 0.35 | | | 48.71 |
| 5 | 104.418 | 5.74 | 1.80809 | 22.8 | 49.00 |
| 6 | −293.318 | 1.17 | | | 48.76 |
| 7 | −2391.685 | 4.66 | 1.59522 | 67.7 | 47.95 |
| 8 | −93.125 | 6.19 | | | 47.79 |
| 9 | 438.426 | 2.10 | 1.85478 | 24.8 | 44.24 |
| 10 | 52.091 | 8.55 | 1.49700 | 81.5 | 42.77 |
| 11 | −154.858 | 0.15 | | | 42.57 |
| 12 | 100.291 | 3.66 | 1.49700 | 81.5 | 42.36 |
| 13 | −990.420 | 0.15 | | | 42.42 |
| 14 | 73.462 | 6.11 | 1.72916 | 54.7 | 42.64 |
| 15 | −240.712 | (Variable) | | | 42.19 |
| 16* | −1719.627 | 1.40 | 1.88300 | 40.8 | 26.37 |
| 17 | 29.503 | 3.72 | | | 23.59 |
| 18 | −554.336 | 1.20 | 1.59522 | 67.7 | 22.91 |
| 19 | 28.294 | 4.14 | 1.85478 | 24.8 | 21.72 |
| 20 | −331.884 | 2.87 | | | 21.54 |
| 21 | −39.703 | 1.20 | 1.76385 | 48.5 | 21.44 |
| 22 | 395.083 | (Variable) | | | 22.02 |
| 23 (Stop) | ∞ | (Variable) | | | 25.38 |
| 24 | 47.874 | 3.33 | 1.59522 | 67.7 | 33.00 |
| 25* | 106.840 | (Variable) | | | 32.94 |
| 26 | 124.439 | 4.98 | 1.49700 | 81.5 | 35.76 |
| 27 | −83.475 | 0.20 | | | 35.84 |
| 28 | 114.925 | 1.66 | 2.00069 | 25.5 | 35.31 |
| 29 | 59.075 | 5.39 | 1.49700 | 81.5 | 34.64 |
| 30 | −102.606 | (Variable) | | | 34.51 |
| 31 | 903.823 | 1.30 | 2.00100 | 29.1 | 30.58 |
| 32 | 55.262 | 5.33 | | | 30.30 |
| 33 | 70.059 | 1.30 | 1.53172 | 48.8 | 32.47 |
| 34 | 43.254 | 3.27 | 1.95906 | 17.5 | 32.73 |
| 35 | 93.390 | 11.99 | | | 32.58 |
| 36 | 71.795 | 8.06 | 1.43875 | 94.9 | 34.33 |
| 37 | −68.391 | 0.20 | | | 34.12 |
| 38 | 49.151 | 12.71 | 1.43875 | 94.9 | 32.51 |
| 39 | −37.526 | 1.87 | 1.88300 | 40.8 | 29.53 |
| 40 | 107.169 | 50.74 | | | 28.91 |
| Image plane | ∞ | | | | |

Aspherical Surface data

Sixteenth surface

K = 1.62250e+003  A4 = 2.01285e−006  A6 = −7.56067e−010
A8 = −2.64653e−012

Twenty-fifth surface

K = 0.00000e+000  A4 = 3.47210e−006  A6 = 3.46178e−010
A8 = −6.11010e−013

Various data
Zoom ratio 10.00

|  | Wide angle | Intermediate | Telephoto |
|---|---|---|---|
| Focal length | 22.00 | 70.00 | 220.00 |
| F-number | 4.00 | 4.00 | 8.00 |
| Half angle of field (degrees) | 35.25 | 12.52 | 4.04 |
| Total lens length | 295.62 | 295.62 | 295.62 |
| BF | 50.74 | 50.74 | 50.74 |
| d15 | 1.00 | 28.91 | 40.47 |
| d22 | 41.20 | 13.29 | 1.74 |
| d23 | 23.35 | 20.57 | 0.54 |
| d25 | 30.29 | 15.46 | 2.07 |
| d30 | 12.41 | 30.02 | 63.43 |
| Entrance pupil position | 41.41 | 71.97 | 90.36 |
| Exit pupil position | −189.80 | −111.70 | −78.53 |
| Front principal point position | 61.40 | 111.81 | −64.04 |
| Rear principal point position | 28.74 | −19.26 | −169.26 |

-continued

Unit mm

Zoom lens unit data

| Unit | First surface | Focal length | Lens structure length | Front principal point position | Rear principal point position |
|---|---|---|---|---|---|
| 1 | 1 | 54.00 | 60.50 | 46.67 | 26.05 |
| 2 | 16 | −22.50 | 14.53 | 3.99 | −5.98 |
| 3 | 24 | 142.21 | 3.33 | −1.66 | −3.70 |
| 4 | 26 | 68.08 | 12.22 | 3.52 | −4.57 |
| 5 | 31 | −109.98 | 11.20 | −1.84 | −10.36 |
| 6 | 36 | 188.41 | 22.85 | −37.90 | −43.97 |

Single lens data

| Lens | First surface | Focal length |
|---|---|---|
| 1 | 1 | −71.42 |
| 2 | 3 | −79.17 |
| 3 | 5 | 94.93 |
| 4 | 7 | 162.10 |
| 5 | 9 | −68.68 |
| 6 | 10 | 79.29 |
| 7 | 12 | 182.91 |
| 8 | 14 | 77.49 |
| 9 | 16 | −32.65 |
| 10 | 18 | −45.03 |
| 11 | 19 | 30.38 |
| 12 | 21 | −46.94 |
| 13 | 24 | 142.21 |
| 14 | 26 | 101.04 |
| 15 | 28 | −122.18 |
| 16 | 29 | 76.06 |
| 17 | 31 | −58.37 |
| 18 | 33 | −215.22 |
| 19 | 34 | 80.32 |
| 20 | 36 | 81.06 |
| 21 | 38 | 50.65 |
| 22 | 39 | −31.10 |

[Numerical Data 4]

Unit mm

Surface data

| Surface Number i | ri | di | ndi | vdi | Effective diameter |
|---|---|---|---|---|---|
| 1* | 426.779 | 2.43 | 1.77250 | 49.6 | 50.94 |
| 2 | 32.659 | 10.90 | | | 42.37 |
| 3 | −128.794 | 1.78 | 1.79952 | 42.2 | 41.72 |
| 4 | 97.121 | 0.20 | | | 41.16 |
| 5 | 59.035 | 3.98 | 1.89286 | 20.4 | 41.46 |
| 6 | 120.032 | 2.02 | | | 40.94 |
| 7 | 119.776 | 5.73 | 1.59522 | 67.7 | 40.56 |
| 8 | −100.607 | 0.20 | | | 40.07 |
| 9 | 76.975 | 1.70 | 1.85478 | 24.8 | 37.00 |
| 10 | 35.889 | 6.69 | 1.49700 | 81.5 | 34.66 |
| 11 | −946.133 | 3.10 | | | 34.48 |
| 12 | 146.999 | 4.37 | 1.59522 | 67.7 | 35.85 |
| 13 | −285.422 | 0.16 | | | 36.12 |
| 14 | 74.293 | 5.12 | 1.76385 | 48.5 | 36.37 |
| 15 | −185.190 | (Variable) | | | 36.04 |
| 16* | −127.842 | 1.13 | 1.88300 | 40.8 | 22.21 |
| 17 | 28.209 | 4.93 | | | 20.00 |
| 18 | −44.599 | 0.97 | 1.59522 | 67.7 | 20.54 |
| 19 | 42.009 | 3.49 | 1.85478 | 24.8 | 21.97 |
| 20 | −118.587 | 2.00 | | | 22.35 |
| 21 | −57.650 | 0.97 | 1.59522 | 67.7 | 22.78 |
| 22 | −139.754 | (Variable) | | | 23.34 |
| 23 (Stop) | ∞ | 1.58 | | | 24.37 |
| 24* | 50.884 | 3.19 | 1.51633 | 64.1 | 25.79 |
| 25 | 244.758 | 0.90 | | | 26.04 |
| 26 | 257.485 | 2.49 | 1.48749 | 70.2 | 26.26 |
| 27 | −450.000 | (Variable) | | | 26.52 |
| 28 | 835.706 | 3.14 | 1.49700 | 81.5 | 26.90 |
| 29 | −85.687 | 0.16 | | | 27.10 |
| 30 | 59.011 | 1.34 | 2.00100 | 29.1 | 27.07 |
| 31 | 37.123 | 0.45 | | | 26.54 |
| 32 | 35.905 | 6.75 | 1.49700 | 81.5 | 26.84 |
| 33 | −154.928 | (Variable) | | | 27.20 |
| 34 | −388.266 | 5.16 | 2.10205 | 16.8 | 31.07 |
| 35 | −71.093 | 1.30 | 2.00330 | 28.3 | 31.35 |
| 36 | 178.787 | (Variable) | | | 31.51 |
| 37 | 495.951 | 4.64 | 1.58913 | 61.1 | 32.16 |
| 38 | −50.652 | 0.16 | | | 32.40 |
| 39 | 105.960 | 8.75 | 1.49700 | 81.5 | 31.69 |
| 40 | −33.613 | 1.52 | 2.00100 | 29.1 | 30.86 |
| 41 | −148.343 | (Variable) | | | 31.33 |

Aspherical Surface data

First surface

K = 1.84103e+002   A4 = 8.01954e−007   A6 = 1.29473e−010
A8 = −7.12351e−013

Sixteenth surface

K = 0.00000e+000   A4 = 3.68316e−006   A6 = −7.99608e−009
A8 = 1.16764e−011

Twenty-fourth surface

K = 0.00000e+000   A4 = −4.20838e−006   A6 = 5.01929e−009
A8 = −8.16027e−012

Various data
Zoom ratio 4.74

| | Wide angle | Intermediate | Telephoto |
|---|---|---|---|
| Focal length | 19.00 | 40.00 | 90.00 |
| F-number | 4.00 | 4.00 | 4.00 |
| Half angle of field (degrees) | 39.30 | 21.22 | 9.80 |
| Total lens length | 241.10 | 241.10 | 241.10 |
| BF | 50.07 | 55.01 | 63.10 |
| d15 | 1.29 | 18.48 | 33.00 |
| d22 | 33.50 | 16.31 | 1.79 |
| d27 | 33.31 | 16.33 | 1.99 |
| d33 | 3.05 | 20.02 | 34.37 |
| d36 | 16.47 | 11.53 | 3.44 |
| d41 | 50.07 | 55.01 | 63.10 |
| Entrance pupil position | 30.42 | 43.50 | 58.70 |
| Exit pupil position | −363.45 | −138.36 | −83.99 |
| Front principal point position | 48.55 | 75.25 | 93.63 |
| Rear principal point position | 31.07 | 14.97 | −26.90 |

Zoom lens unit data

| Unit | First surface | Focal length | Lens structure length | Front principal point position | Rear principal point position |
|---|---|---|---|---|---|
| 1 | 1 | 50.50 | 48.40 | 39.04 | 27.37 |
| 2 | 16 | −21.95 | 13.49 | 1.18 | −9.24 |
| 3 | 24 | 90.95 | 6.58 | 0.58 | −4.13 |

-continued

Unit mm

| | | | | | |
|---|---|---|---|---|---|
| 4 | 28 | 74.41 | 11.85 | 3.26 | −4.72 |
| 5 | 34 | −141.16 | 6.46 | 1.95 | −1.12 |
| 6 | 37 | 100.00 | 15.06 | −1.83 | −11.07 |

Single lens data

| Lens | First surface | Focal length |
|---|---|---|
| 1 | 1 | −45.68 |
| 2 | 3 | −68.62 |
| 3 | 5 | 124.77 |
| 4 | 7 | 92.44 |
| 5 | 9 | −79.45 |
| 6 | 10 | 69.53 |
| 7 | 12 | 163.06 |
| 8 | 14 | 69.67 |
| 9 | 16 | −25.93 |
| 10 | 18 | −36.06 |
| 11 | 19 | 36.31 |
| 12 | 21 | −165.01 |
| 13 | 24 | 123.26 |
| 14 | 26 | 335.20 |
| 15 | 28 | 156.10 |
| 16 | 30 | −102.34 |
| 17 | 32 | 59.18 |
| 18 | 34 | 77.22 |
| 19 | 35 | −50.15 |
| 20 | 37 | 77.95 |
| 21 | 39 | 52.28 |
| 22 | 40 | −43.36 |

TABLE 1

| Conditional Expression Number | Conditional Expression | Example 1 | Example 2 | Example 3 | Example 4 |
|---|---|---|---|---|---|
| (1X), (1Y) | $|f51P \times (n51P - 1)/f51|$ | 0.509 | 0.634 | 0.698 | 0.603 |
| (2X), (2Y) | n51P | 1.95906 | 1.95906 | 1.95906 | 2.10205 |
| (3X), (3Y) | n51N | 2.00069 | 1.85478 | 2.00100 | 2.00330 |
| (4X), (4Y) | v51P | 17.47 | 17.47 | 17.47 | 16.77 |
| (5X), (5Y) | v51N | 25.46 | 24.80 | 29.13 | 28.27 |
| | θ51P | 0.6598 | 0.6598 | 0.6598 | 0.6721 |
| | θ51N | 0.6135 | 0.6122 | 0.5994 | 0.5980 |
| (6X), (6Y) | (θ51P − θ51N)/(v51N − v51P) | $5.79 \times 10^{-3}$ | $6.49 \times 10^{-3}$ | $5.18 \times 10^{-3}$ | $6.44 \times 10^{-3}$ |
| (7X), (7Y) | D4w/D4t | 0.197 | 0.263 | 0.196 | 0.089 |

TABLE 2

| Conditional Expression Number | Reference Expression | Example 1 | Example 2 | Example 3 | Example 4 |
|---|---|---|---|---|---|
| | $\alpha_s$ | 0.020 | 0.071 | 0.059 | 0.041 |
| | $\alpha_s'$ | 0.053 | 0.021 | 0.023 | 0.021 |
| (c) | IIE | 0.906 | 0.279 | 1.012 | 0.987 |
| (e) | IIIE | 0.038 | 0.019 | −0.005 | 0.012 |
| (l) | TE | 0.002 | 0.007 | −0.007 | −0.008 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-206069, filed Oct. 20, 2015, which is hereby incorporated by reference herein in its entirety.

What is claimed is:

1. A zoom lens comprising:
a first lens unit having a positive refractive power;
a second lens unit having a negative refractive power;
a third lens unit having a positive refractive power;
a fourth lens unit having a positive refractive power; and
a rear lens unit, wherein
the first to fourth and rear lens units are arranged in order from an object side to an image side and configured so that an interval between each pair of adjacent lens units therein is changed for zooming,
the rear lens unit includes a front-side subunit having a negative refractive power and a rear-side subunit having a positive refractive power, which are arranged in order from the object side to the image side,
the front-side subunit is configured to be moved in a direction having a component in a direction perpendicular to an optical axis for image blur correction,
the front-side subunit includes a positive lens and a negative lens, and
conditional expressions $$0.3 < |f51P \times (n51P - 1)/f51| < 0.8;$$

$$1.88 < n51P;$$

$$1.85 < n51N;$$

$$v51P < 30.0; \text{ and}$$

$$v51N < 30.0$$

are satisfied, where f51 represents a focal length of the front-side subunit, f51P represents a focal length of the positive lens, n51P and v51P respectively represent a refractive index and an Abbe number of a material of the positive lens, n51N and v51N respectively represent a refractive index and an Abbe number of a material of the negative lens.

2. A zoom lens according to claim 1, wherein the second lens unit and the fourth lens unit are configured to be moved for zooming.

3. A zoom lens according to claim 1, wherein an interval between the front-side subunit and the rear-side subunit is not changed for zooming.

4. A zoom lens according to claim 1, wherein a conditional expression $$2.5 \times 10^{-3} < (\theta 51P - \theta 51N)/(v51N - v51P)$$

is satisfied, where θ51P represents a partial dispersion ratio of the material of the positive lens, and θ51N represents a partial dispersion ratio of the material of the negative lens.

5. A zoom lens according to claim 1, wherein a conditional expression $$0.04 < D4wX/D4tX < 0.40$$

is satisfied, where D4wX and D4tX respectively represent an interval between the fourth lens unit and the rear lens unit at a wide angle end and an interval between the fourth lens unit and the rear lens unit at a telephoto end.

6. A zoom lens according to claim 1, wherein the front-side subunit consists of the positive lens and the negative lens.

7. A zoom lens according to claim 1, wherein the front-side subunit consists of the positive lens and two negative lenses.

8. A zoom lens according to claim 1, wherein the rear-side subunit includes a positive lens and a negative lens.

9. A zoom lens according to claim 1, wherein a conditional expression $$0.3 < |f51P \times (n51P-1)/f51| < 0.75$$

is satisfied.

10. An image pickup apparatus, comprising:
a zoom lens; and
an image pickup element disposed at an image plane of the zoom lens, wherein
the zoom lens includes:
  a first lens unit having a positive refractive power;
  a second lens unit having a negative refractive power;
  a third lens unit having a positive refractive power;
  a fourth lens unit having a positive refractive power; and
  a rear lens unit, wherein
the first to fourth and rear lens units are arranged in order from an object side to an image side and configured so that an interval between each pair of adjacent lens units therein is changed for zooming,
the rear lens unit includes a front-side subunit having a negative refractive power and a rear-side subunit having a positive refractive power, which are arranged in order from the object side to the image side,
the front-side subunit is configured to be moved in a direction having a component in a direction perpendicular to an optical axis for image blur correction,
the front-side subunit includes a positive lens and a negative lens, and
conditional expressions $$0.3 < |f51P \times (n51P-1)/f51| < 0.8;$$

$$1.88 < n51P;$$

$$1.85 < n51N;$$

$$v51P < 30.0; \text{ and}$$

$$v51N < 30.0$$

are satisfied, where f51 represents a focal length of the front-side subunit, f51P represents a focal length of the positive lens, n51P and v51P respectively represent a refractive index and an Abbe number of a material of the positive lens, and n51N and v51N respectively represent a refractive index and an Abbe number of a material of the negative lens.

11. An image pickup apparatus according to claim 10, wherein a conditional expression $$0.3 < |f51P \times (n51P-1)/f51| < 0.75$$

is satisfied.

12. A zoom lens comprising:
a first lens unit having a positive refractive power;
a second lens unit having a negative refractive power;
a third lens unit having a positive refractive power;
a fourth lens unit having a positive refractive power;
a fifth lens unit; and
a sixth lens unit having a positive refractive power, wherein
the first to sixth lens units are arranged in order from an object side to an image side and configured so that an interval between each pair of adjacent lens units therein is changed for zooming,
the fifth lens unit includes a positive lens and a negative lens, and is configured to be moved in a direction having a component in a direction perpendicular to an optical axis for image blur correction, and
conditional expressions $$0.3 < |f5P \times (n5P-1)/f5| < 0.8;$$

$$1.88 < n5P;$$

$$1.85 < n5N;$$

$$v5P < 30.0; \text{ and}$$

$$v5N < 30.0$$

are satisfied, where f5 represents a focal length of the fifth lens unit, f5P represents a focal length of the positive lens, n5P and v5P respectively represent a refractive index and an Abbe number of a material of the positive lens, and n5N and v5N respectively represent a refractive index and an Abbe number of a material of the negative lens.

13. A zoom lens according to claim 12, wherein the second lens unit, the fourth lens unit, and the sixth lens unit are configured to be moved for zooming.

14. A zoom lens according to claim 12, wherein a conditional expression $$2.5 \times 10^{-3} < (\theta 5P - \theta 5N)/(v5N - v5P)$$

is satisfied, where θ5P represents a partial dispersion ratio of the material of the positive lens, and θ5N represents a partial dispersion ratio of the material of the negative lens.

15. A zoom lens according to claim 12, wherein a conditional expression $$0.04 < D4wY/D4tY < 0.40,$$

is satisfied, where D4wY and D4tY respectively represent an interval between the fourth lens unit and the fifth lens unit at a wide angle end and an interval between the fourth lens unit and the fifth lens unit at a telephoto end.

16. A zoom lens according to claim 12, wherein the fifth lens unit consists of the positive lens and the negative lens.

17. A zoom lens according to claim 12, wherein the sixth lens unit includes a positive lens and a negative lens.

18. A zoom lens according to claim 12, wherein a conditional expression $$0.3 < |f5P \times (n5P-1)/f5| < 0.75$$

is satisfied.

19. An image pickup apparatus comprising:
a zoom lens; and
an image pickup element disposed at an image plane of the zoom lens, wherein
the zoom lens includes:
  a first lens unit having a positive refractive power;
  a second lens unit having a negative refractive power;

a third lens unit having a positive refractive power;
a fourth lens unit having a positive refractive power;
a fifth lens unit; and
a sixth lens unit having a positive refractive power, wherein
the first to sixth lens units are arranged in order from an object side to an image side and configured so that an interval between each pair of adjacent lens units therein is changed for zooming,
the fifth lens unit includes a positive lens and a negative lens, and is configured to be moved in a direction having a component in a direction perpendicular to an optical axis for image blur correction, and
conditional expressions $0.3 < |f5P \times (n5P-1)/f5| < 0.8;$ $1.88 < n5P;$ $1.85 < n5N;$ $v5P < 30.0;$ and $v5N < 30.0$ are satisfied, where f5 represents a focal length of the fifth lens unit, f5P represents a focal length of the positive lens, n5P and v5P respectively represent a refractive index and an Abbe number of a material of the positive lens, and n5N and v5N respectively represent a refractive index and an Abbe number of a material of the negative lens.

20. An image pickup apparatus according to claim 19, wherein a conditional expression $0.3 < |f5P \times (n5P-1)/f5| < 0.75$ is satisfied.

* * * * *